US012502325B2

(12) United States Patent
Pannucci et al.

(10) Patent No.: US 12,502,325 B2
(45) Date of Patent: Dec. 23, 2025

(54) LIFTING DEVICE AND ASSOCIATED METHODS

(71) Applicant: Redline Innovations, Inc, Indian Harbour Beach, FL (US)

(72) Inventors: Michael Pannucci, Melbourne, FL (US); Robert Clark, Melbourne, FL (US)

(73) Assignee: Redline Innovations, Inc., Indian Harbour Beach, FL (US)

( * ) Notice: Subject to any disclaimer, the term of this patent is extended or adjusted under 35 U.S.C. 154(b) by 67 days.

(21) Appl. No.: 18/640,148

(22) Filed: Apr. 19, 2024

(65) Prior Publication Data

US 2024/0261162 A1 Aug. 8, 2024

Related U.S. Application Data

(63) Continuation-in-part of application No. 17/936,171, filed on Sep. 28, 2022, now abandoned.

(60) Provisional application No. 63/250,531, filed on Sep. 30, 2021.

(51) Int. Cl.
*A61G 7/10* (2006.01)

(52) U.S. Cl.
CPC ......... *A61G 7/1015* (2013.01); *A61G 7/1046* (2013.01); *A61G 7/1051* (2013.01); *A61G 7/1059* (2013.01)

(58) Field of Classification Search
None
See application file for complete search history.

(56) References Cited

U.S. PATENT DOCUMENTS

| | | | | |
|---|---|---|---|---|
| 6,006,376 | A | 12/1999 | Williamson | |
| 6,374,440 | B1 | 4/2002 | Thim | |
| 8,397,320 | B2 | 3/2013 | Capaldi | |
| 9,814,644 | B2 * | 11/2017 | Clark .................. | A61G 7/1011 |
| 10,500,122 | B2 | 12/2019 | Aryananda et al. | |
| 2012/0291197 | A1 * | 11/2012 | Martin ................ | A61G 7/1019 5/85.1 |

(Continued)

OTHER PUBLICATIONS

Written Opinion in related application PCT/US2022/077197 issued Jan. 4, 2023; 5 pages.

(Continued)

*Primary Examiner* — Adam C Ortiz
(74) *Attorney, Agent, or Firm* — Widerman Malek, PL; Mark Malek

(57) ABSTRACT

A lifting device is provided that includes side members, top support members, a front shield member, hoist assemblies, and a load member. The side members may be movable between a collapsed position and an extended position. Each top support member may be carried by one of the side members. The front shield member may be extended between and pivotally attached to each of the side members. The front shield member may be movable between a collapsed position and an extended position. Each hoist assembly may be carried by one of the side members. The hoist assemblies may be movable between a collapsed position and an extended position. The load member may be connected to each top support member. The load member may be moved between a retracted position and a released position when the hoist assemblies move between the collapsed position and the extended position.

18 Claims, 16 Drawing Sheets

(56) References Cited

U.S. PATENT DOCUMENTS

| | | | |
|---|---|---|---|
| 2013/0228536 A1 | 9/2013 | Crowley | |
| 2017/0165145 A1 | 6/2017 | Aryananda et al. | |
| 2017/0251827 A1 | 9/2017 | Gallina | |
| 2020/0168308 A1 | 5/2020 | Ledwith et al. | |
| 2020/0345569 A1* | 11/2020 | Paramonov .......... | A61G 7/1015 |
| 2020/0377347 A1 | 12/2020 | Strassle et al. | |
| 2022/0401278 A1 | 12/2022 | Kawaja et al. | |

OTHER PUBLICATIONS

International Search Report in related application PCT/US2022/077197 issued Jan. 4, 2023; 4 pages.

* cited by examiner

LIFTING DEVICE AND ASSOCIATED METHODS

RELATED APPLICATIONS

This application is a continuation-in-part application of and claims priority under 35 U.S.C. § 120 of U.S. patent application Ser. No. 17/936,171 filed on Sep. 28, 2022 and titled LIFTING DEVICE AND ASSOCIATED METHODS, which in turn claims priority under 35 U.S.C. § 119(e) of U.S. Provisional Patent Application Ser. No. 63/250,531 filed on Sep. 30, 2021 and titled LIFTING DEVICE AND ASSOCIATED METHODS. The contents of these applications are incorporated herein by reference except for where they conflict with the content herein.

FIELD OF THE INVENTION

The present invention relates a lifting device and, more specifically, to a lifting device for use in the healthcare field to assist with lifting of patients in various medical scenarios.

BACKGROUND OF THE INVENTION

In many lines of work there are occasions that involve lifting and sometimes carrying an individual who is incapable of picking themselves off the ground, or incapable of moving from one place to another, such as from a chair to a bed, or a bed to another bed. It can often be difficult or dangerous for a worker to lift such individuals, especially if the worker is small in stature, or when the individual in need of help is heavier set. These dangerous situations run the risk of causing injury and/or discomfort to either the worker or the individual in need of help.

This has created a need for a device that can be used to lift individuals in a safer manor to reduce that chances of injuries or discomfort from taking place. Especially in cases where the individual in need of assistance is larger than the worker trying to assist the individual. There are some devices already available in the prior art which attempt to remedy these situations. Such as U.S. Pat. No. 9,814,644 (hereinafter "the '644 patent") for a "lifting device and associated methods and U.S. patent application Ser. No. 17/936,171 (hereinafter "the '171 application") for a "lifting device and associated methods". The '644 patent was useful and has helped a number of people over the years, but it became apparent over time there was a need for a device that could laterally expand to be used to lift individuals from or around furniture and objects.

It also became apparent that wheels could not be added to the '644 patent since it would make it unstable, so a wider more stable structure of a lifting device would be needed so that wheels could be added to the lifting device for transporting lifted individuals. Moreover, there was an apparent need for a lifting device that could be horizontally expandable and contractible, so that the lifting device could be used over a variety of furniture, objects, and environments. Ideally, a lifting device would contain these features and also be disassemble-able for ease of transportation and storing the lifting device when the lifting device is not in use.

The '171 application was also useful, but it has become apparent that there was a need for a lifting device that could laterally expand under its own power and be used to lift individuals from the ground or from or around furniture and objects. With this, it also be apparent that more than one hoist assembly would need to be added so that the lifting device could laterally expand under its own power. Additionally, there was an apparent need for a lifting device that could be further horizontally collapsible and expandable so that the lifting device did not require disassembly for ease of transportation and storage when the lifting device is not in use.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a lifting device that includes a pair of side members, a respective pair of top support members, a front shield member, a respective pair of hoist assemblies, and a load member. The side members may be movable between a collapsed position and an extended position. Each top support member may be carried by one of the side members. The front shield member may be extending between and pivotally attached to each of the side members. The front shield member may be movable between a collapsed position and an extended position. Each hoist assembly may be carried by one of the side members. The hoist assemblies may be movable between a collapsed position and an extended position. The load member may have an end connected to one of the top support members and another end connected to another one of the top support members. The load member may be in communication with the hoist assemblies. The load member may be moved between a retracted position and a released position when the hoist assemblies move between the collapsed position and the extended position.

Some embodiments of the present invention may include a bar member that may be movable between a stowed position and a connected position. The connected position of the bar member may be defined as when the bar member extending between the top support members. The pair of side members may each comprise two or more legs and one or more of a connecting support member which may be connected to and extending between the two or more of the legs. The connecting support member(s) may comprise an engagement member that may be operable to move between an engaged position and a released position. When the engagement member is in the engaged position, the side member may be prevented from moving between the collapsed position and the extended position. When the engagement member is in the released position, the side member may be moveable between the collapsed position and the extended position.

The front shield member may include a first shield member and a second shield member that may be pivotally connected to the first shield member. The collapsed position of the front shield member may be defined as when the first and the second shield members are positioned to substantially face one another. The extended position of the front shield member may be defined as when the first and the second shield members are positioned to be substantially aligned with one another in a similar plane.

Some embodiments of the present invention may include one or more of a wheel member that may be connected to one of the side members. Some embodiments of the present invention may include an input interface that may be in communication with a control unit. The control unit may be operable to selectively move the hoist assemblies between the collapsed position and the extended position based on inputs made via the input interface. Some embodiments of the present invention may include one or more of a piston. The piston(s) may have a first end that may be connected to one of the side members, and the piston(s) may have a second end that may be connected to the front shield member. The piston(s) may actuate to move the front shield member between the collapsed position and the extended position. Each of the hoist assemblies may include a pulley member that may be in communication with the load member.

In some embodiments of the present invention, the control unit may include a receiver that may be operable to receive a user device input signal from a user device. In some embodiments of the present invention, the input interface may be operable to receive inputs and generate an input interface signal. Some embodiments of the present invention may include one or more conduits. Each conduit may be carried by one of the side members. The conduits may be movable between a collapsed position and an extended position. The conduits may comprise telescopic tubing to carry wiring therein and therethrough. In some embodiments of the present invention, the legs may comprise wheel members attached to a lower portion of each leg. The wheel members may include a wheel lock that may be operable to prevent rotational movement of the wheel member.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
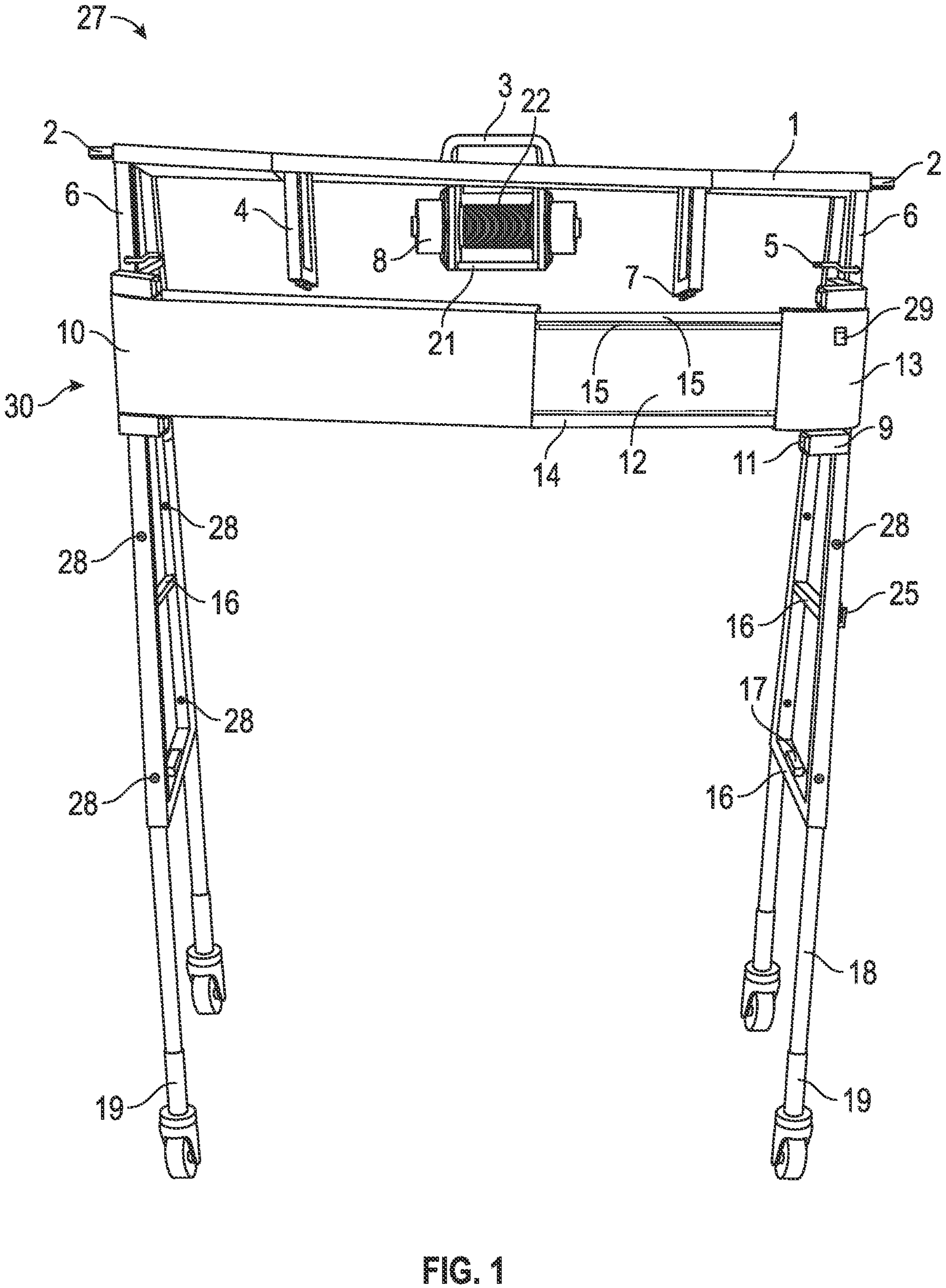
FIG. 1 is a perspective view of a lifting device according to the present invention.
Figure 2:
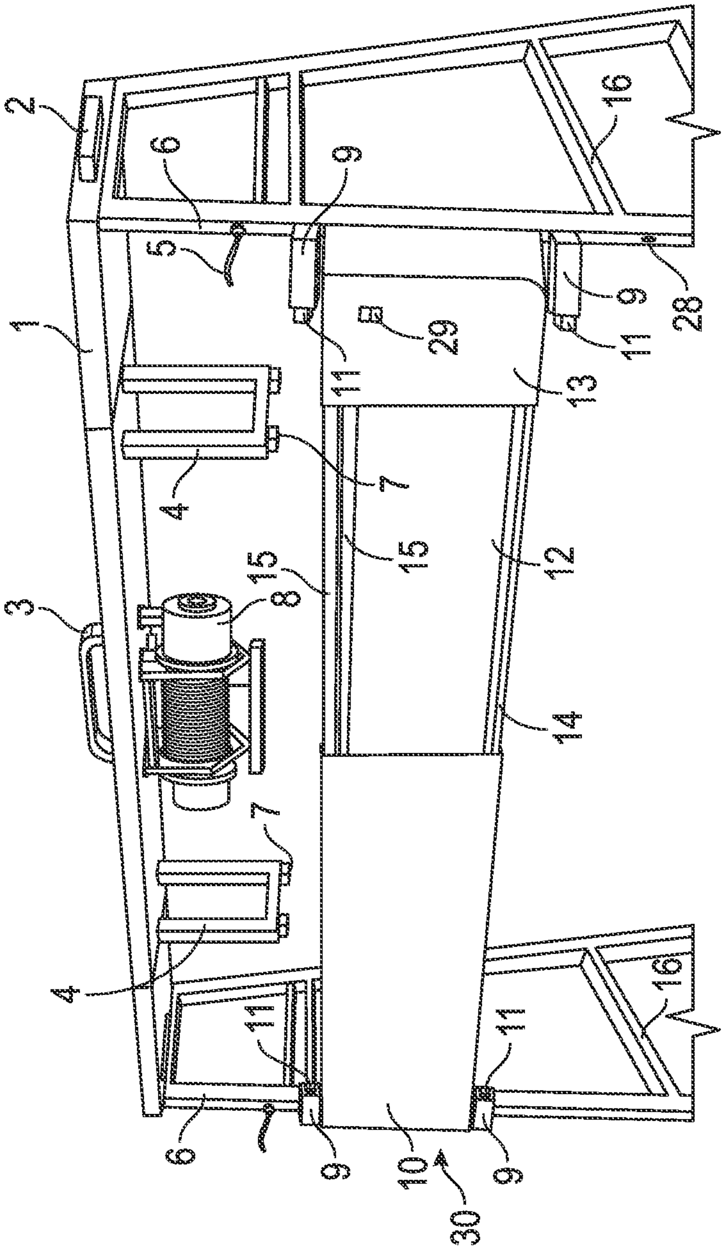
FIG. 2 is a perspective view of an upper portion of the lifting device illustrated in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as “above,” “below,” “upper,” “lower,” and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as “generally,” “substantially,” “mostly,” and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a lifting device 27. The lifting device 27 according to embodiments of the present invention may advantageously be used to assist in lifting a person, such as a patient, from the ground. For example, the lifting device 27 may be used by hospital personnel to lift patients, or to assist patients that are not otherwise mobile, or who may need to be moved from one position to another, e.g. from a wheelchair to a bed. The lifting device 27 according to the present invention is also moveable between collapsed and extended positions, as will be discussed in greater detail below, and can therefore advantageously be used in connection with emergency personnel. More particularly, emergency personnel can readily collapse the lifting device 27 so that it can be stored on an emergency vehicle, such as an ambulance or a firetruck, for example. Those skilled in the art will appreciate that the lifting device 27 according to embodiments of the present invention may advantageously be used for any number of necessary lifting necessities in any number of different situations.

The lifting device 27 according to the present invention may be used to prevent back injury, for example, of personnel that may be responsible for lifting patients, or other persons. For example, and in reference to ambulance personnel, there are several calls to assist fallen patients. Back injuries may occur to ambulance personnel when attempting to lift such patients, especially when the patient is located on the ground. Using the lifting device 27 according to embodiments of the present invention may advantageously reduce, or even eliminate, such back injuries that ambulance personnel may sometimes suffer. A similar situation occurs when hospital personnel help patients from the ground or when assisting a patient in moving from one position to another. The lifting device 27 according to the present invention may be used to reduce the potential for such injuries.

Further, use of the lifting device 27 according to the present invention may greatly reduce the risk of injury to a patient. The process for lifting a patient that may be positioned on the ground, or moving the patient from one location to another, may be dangerous for the patient. The lifting device 27 according to embodiments of the present invention may advantageously be used to readily move the patient as necessary, while simultaneously reducing the risk of injury to the patient.

Referring now more specifically to FIGS. 1-12, additional features of lifting device 27 are now described in greater detail. More specifically, the lifting device 27 may comprise a top member 1 located at the upper area of the lifting device 27. As will be described in greater detail below, since the lifting device 27 is moveable between extended and collapsed positions, the top member 1 may also be moveable from an extended position to a collapsed position to minimized space required for storage of the lifting device and to allow for ease of transport of the lifting device 27 by a user, as perhaps best illustrated, for example, in FIGS. 6 & 10. The ease of transporting the device is further increased with the inclusion of a carry handle member 3 that may be used to carry the lifting device 27 when in a collapsed position. For example, the carry handle member 3 can be used when the lifting device 27 is being transported over rough terrain, ground, or to more easily carry the lifting device 27 as perhaps best illustrated in FIG. 9. While a single carry handle member 3 is shown, it is contemplated and included within the scope of the invention that any number of handles may be provided and that the handles may be located anywhere on the top member 1 or any other element of the lifting device 27 to advantageously facilitate lifting and carrying thereof.

The lifting device 27 may also comprise at the opposing ends of the top member 1 a side handle 2 on both ends. Each side handle 2 may be used to manipulate top member 1 when the lifting device 27 is fully assembled, disassembled, or collapsed or non-collapsed. Those skilled in the art will appreciate that the side handles 2 are an optional feature that provide additional advantages to the lifting device 27, and that the lifting device 27 may be provided with or without side handles 2 while still accomplishing the goals, features and advantages according to the present invention.

Referring now to FIGS. 1-4, & 11, the lifting device 27 according to embodiments of the present invention may further illustratively comprise a hoist assembly 8. The hoist assembly 8 may be fixedly attached to a lower surface of the top member 1. The hoist assembly 8 is illustrated as being positioned close to a center portion of the top member 1, but those skilled in the art will appreciate that the hoist assembly may be positioned anywhere in connection with the top member while still accomplishing the goals, features and advantages of the present invention. The hoist assembly 8 may be operable to supply the force necessary to lift a person or patient. The hoist assembly 8 can be configured to actuate a lifting force to lift a patient as described, depending on the intended application of the lifting device 27. The hoist assembly 8 may compose of a coiled member 22 located within the hoist assembly 8 fixedly connected to the hoist assembly 8 such that the coiled member 22 may have the ability to rotate about one of the coiled member's 22 axes. More specifically, the hoist assembly 8 may, for example, be provided by a winch. The hoist assembly 8 may further include a load member 26 that is rope-like and connected to the coiled member 22 that may be in a wrapped configuration so that the load member 26 is wound around the coiled member 22. A user operating the lifting device 27 may use the hoist assembly 8 to rotate the coiled member 22 around an axis such that the load member 26 is wound or unwound from around the coiled member 22 to control a person's position above the ground as illustratively shown in FIGS. 3, 5, & 7.

How a person is lifted with the lifting device is discussed in more detail below. The hoist assembly 8 may further comprise a bar member 21 extending the length of the coiled member 22 that may be included to ensure that the load member 26 does not tangle when wound or unwound from the coiled member 22, and to reduce other possible issues with the load member 26 when the lifting device 27 is in use. The functionality of the coiled member 22 and the load member 26 is discussed in more detail below.

The lifting device 27 may also comprise a U-shaped member 4 located on the bottom side of top member 1 and near each end of the top member 1. As illustrated, for example, in FIG. 8, a pair of U-shaped members 4 may be provided and may be positioned on either end of the coiled member 22 to oppose one another. Each U-shaped member 4 may be placed such that each does not interfere with the ability for the lifting device 27 to collapse. Placement of the U-shaped members 4 when the lifting device is in its collapsed state is best illustratively shown in FIGS. 6 and 10. Protrusion member 7 that may act as leg members may be fixedly connected to bottom portions of the U-shaped members 4. The U-shaped members 4 may work in concert with the protrusion members 7 such that they support the top member 1 when the top member has been removed from the lifting device 27 and the top member 1 has been placed on a surface. The U-shaped members 4 may also act as legs and the protrusion members 7 may act as feet. Those skilled in the art will appreciate that the U-shaped members 4 and protrusion members 7 prevent the hoist assembly 8 from touching a surface that the top member 1 has been placed upon when the top member 1 has been removed from the lifting device 27.

With reference to FIGS. 1-4, the lifting device 27 may also include a front shield member 30 connected to the upper portions of the side members 6. The front shield member 30 may include a first shield member 10 and a second shield member 13 connected to the first shield member 10. The second shield member 13 may include a small shield square 29 located on the front facing area of the second shield member 13. The small shield square 29 may be a locking member to lock the front shield member 30 in a collapsed position when the lifting device 27 is moved from a horizontally extended position to a horizontally collapsed position, as will be discussed in greater detail below. The front shield member 30 may also include a center shield member 12 connected to a rear portion of the second shield member 13 such that it lays horizontally to slide underneath the first shield member 10 when the lifting device 27 is in the collapsed position as illustratively shown in FIG. 6. The front shield member 30 may also illustratively include a lower sliding support member 14 located at the lower end of first shield member 10 and second shield member 13. The lower sliding support member 14 may be adapted so that may be collapsed when the lifting device 27 is collapsed by a user. The front shield member 30 may also illustratively include a pair of upper sliding support members 15 on the upper portion of the front shield member oriented horizontally and preferably behind both the first shield member 10 and the second shield member 13. The upper sliding support member 15 may be adapted so that may be able to collapse when the lifting device 27 is collapsed by a user. Accordingly, the front shield member 30 may be moved between an extended position (illustrated, for example, in FIG. 1) and a collapsed position (illustrated, for example, in FIGS. 5-7). Further, the first shield member 10 slidably engages the second shield member 13 to allow for the front shield member 30 to be moved between the extended and the collapsed positions.

With reference to FIGS. 1 & 3-7, the lifting device 27 may further comprise a pair of side members 6. Each side member 6 may be adapted to allow for the bottom side of opposite ends of the top member 1 to be rested thereon. More specifically, and as perhaps best illustrated in FIG. 1, the top member 1 may be positioned to rest on the side members 6 so that the side members provide support to the top member when the lifting device 27 is in use. Each side member 6 can be made at various angles, however, it is preferable that the width of the side member 6 expands or tapers outwardly from its top to its bottom. Those skilled in the art will find a greater width of expansion of a side member 6 provides enhanced stability of the lifting device 27. Each side member 6 may also illustratively include a plurality of horizontal connecting support members 16.

Each horizontal connecting support member 16 can vary in angle and placement along the inside of each side member 6. Those skilled in the art, however, will appreciate that any number of connecting support members 16 at various angles or sizes may be provided while still accomplishing the goals, features, and objectives according to the embodiments of the present invention. The side member 6 may also include a pair of hook members 25 located on the outer side of a connecting support member 16 that may provide a place to store a remote 20.

The remote 20 may be used with the lifting device 27 to remotely control the automated characteristics of the enumerated invention which may be through wired or wireless communication via the user inputs on the remote 20. However, those skilled in the art will appreciate that a remote is not required for the embodied invention to operate. For example, the embodied invention may be operated by buttons placed elsewhere on the invention that are in communication with the hoist assembly 8 to move the hoist assembly up and down, or the lifting device 27 may be configured to operate without the need for a remote or buttons.

Furthermore, it is not necessary that the lifting device 27 be configured to operate by electric power and may instead be made to operate by manual force or other type of force, including but not limited to hydraulic power. In the preferred embodiment, however, the lifting device 27 which operates on electric power may comprise a wire member 24 used to supply the electric power to the hoist member 8 as illustrated, for example, in FIGS. 3 and 4. The wire member 24 may be connected to the hoist member 8 and any suitable power source. For example, for use of the lifting device 27 by ambulance personnel the lifting device 27 may be powered by plugging the wire member 24 to some power source outlet on the ambulance or other vehicle. Alternatively, the lifting device 27 may also be powered by the wire member 24 being connected to some battery supply of electric power. It is also contemplated that a battery may be included on the lifting device 27 and in electrical communication with the hoist assembly 8 to provide power so that the hoist assembly may be readily moved up and down.

Another alternative to electrically power the lifting device 27 is to have the wire member 24 transmit power from plugging into electric wall outlets. Those skilled in the art will appreciate that an electric powered lifting device 27 can be powered by a number of different sources of electric power while still accomplishing the goals, objectives, and features according to the embodiments of the present invention. In a manual configuration, those skilled in the art will appreciate that the device may include a crank member (not shown), that is connected to the coiled member 22 so that a user can crank the load member 26 to move the seat member 23 between an elevated and a lowered position.

Referring to FIGS. 1-8, lifting device 27 may also comprise of angled members 5 connected to the upper front sides of each side member 6. The angled member 5 may be used to lock the lifting device in place. The angled member 5 may work as a clamping lever used to lock the side members 28 in place to restrict the side members' 28 movement. Each angled member 5 may be turned clockwise or counterclockwise to restrict or unrestrict the movement of a side member 28. Those skilled in the art will appreciate that there are a plurality of different mechanisms that can be used to accomplish the functionality desired to restrict and unrestrict the leg members 28 while still accomplishing the goals, features, and advantages of lifting device 27.

Referring now to FIGS. 1-7, the lifting device 27 may also comprise of a number of arm members 9 connected to upper front facing sides of the side members 6 that may abut sides of the front shield member 30. The lifting device 27 may also include arm cap members 11 attached to the ends of each of the arm members 9. The arm members 9 may illustratively provide enhanced support to the front shield member 30 when the front shield member 30 is connected to the side members 6 as illustrated, for example, in FIG. 7.

Figure 3:
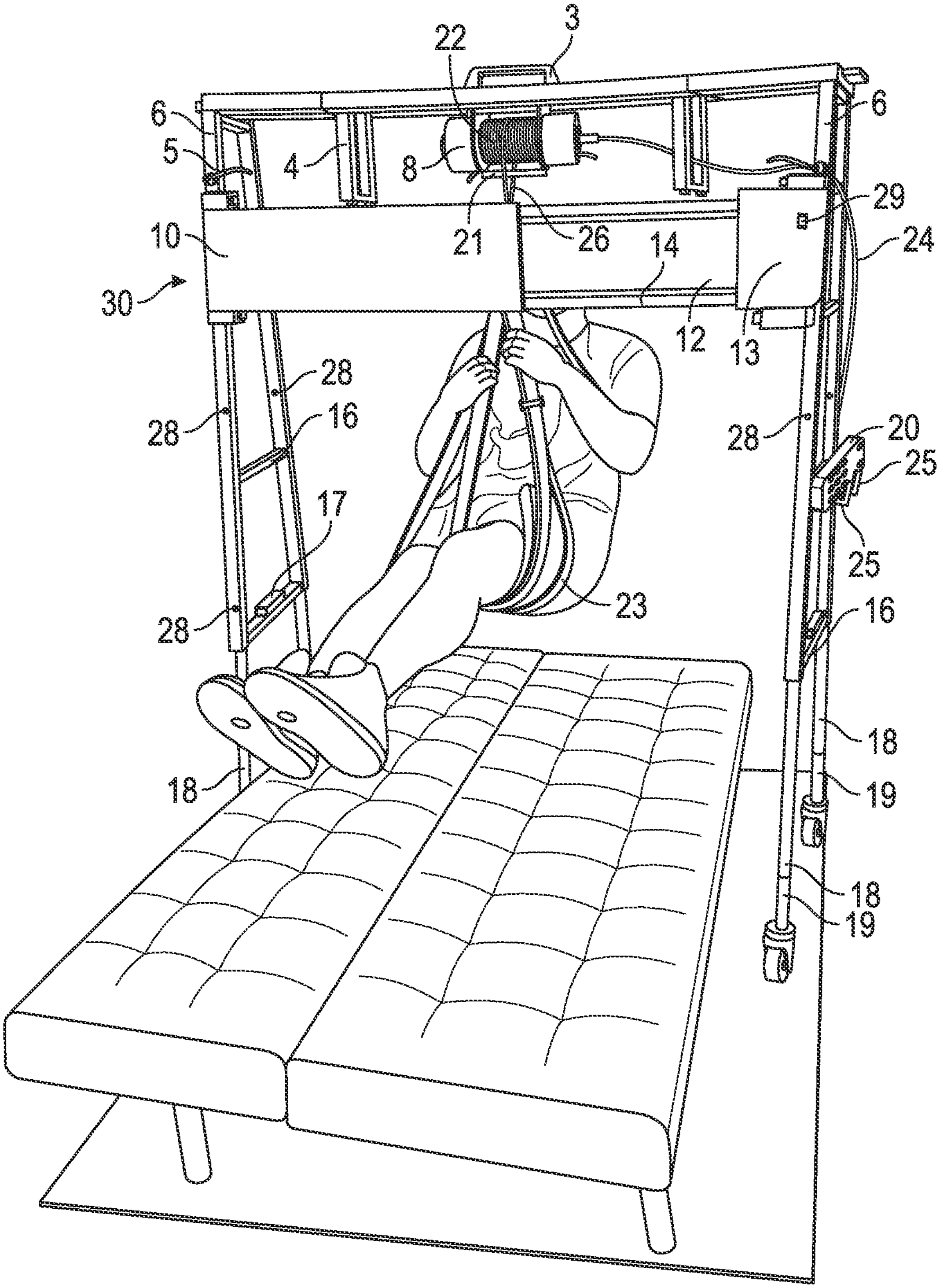
FIG. 3 is a perspective view of the lifting device illustrated in FIG. 1 in use to lift a person over an item of furniture.
Figure 4:
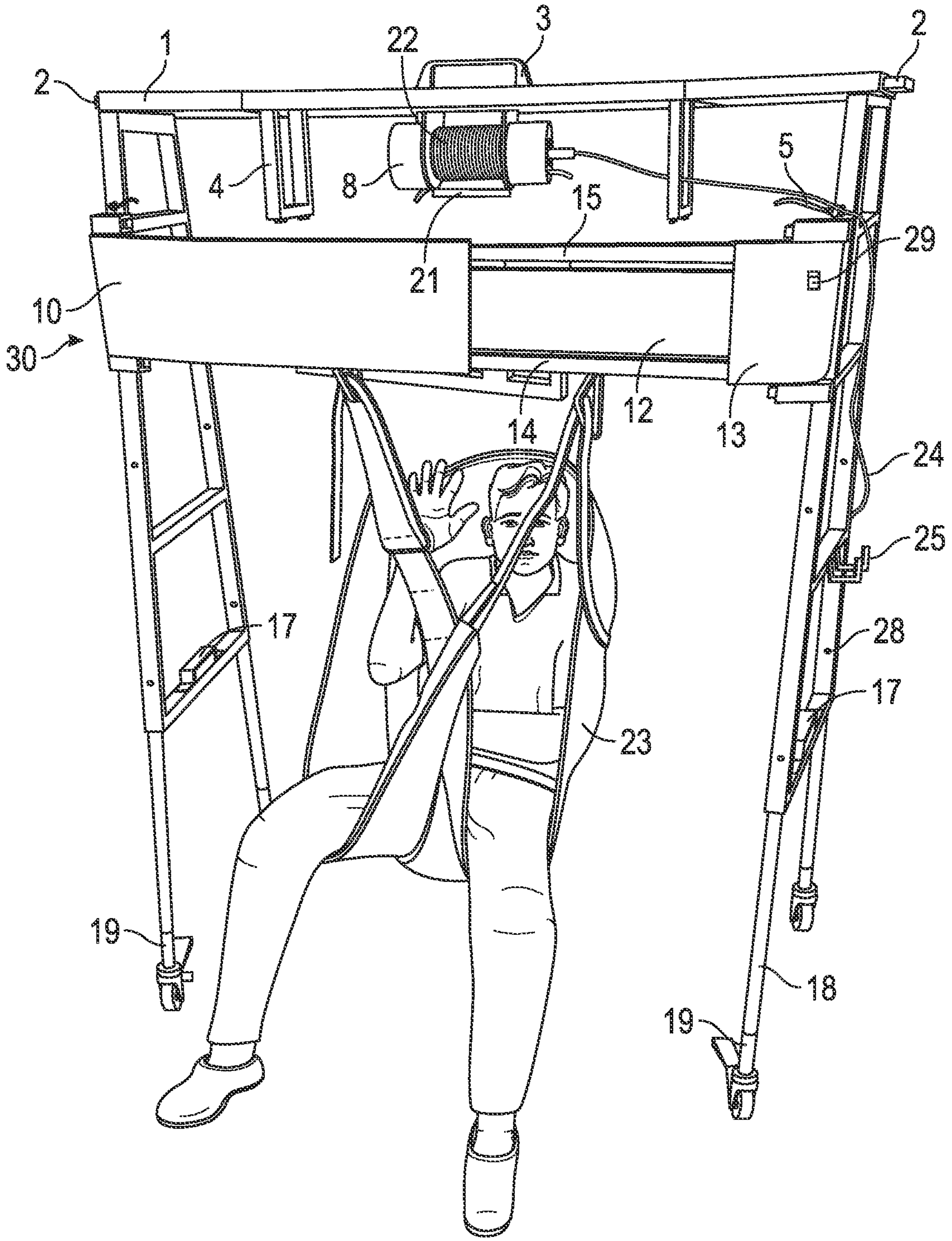
FIG. 4 is a perspective view of the lifting device illustrated in FIG. 1 in use to suspend a person above the ground.
Figure 5:
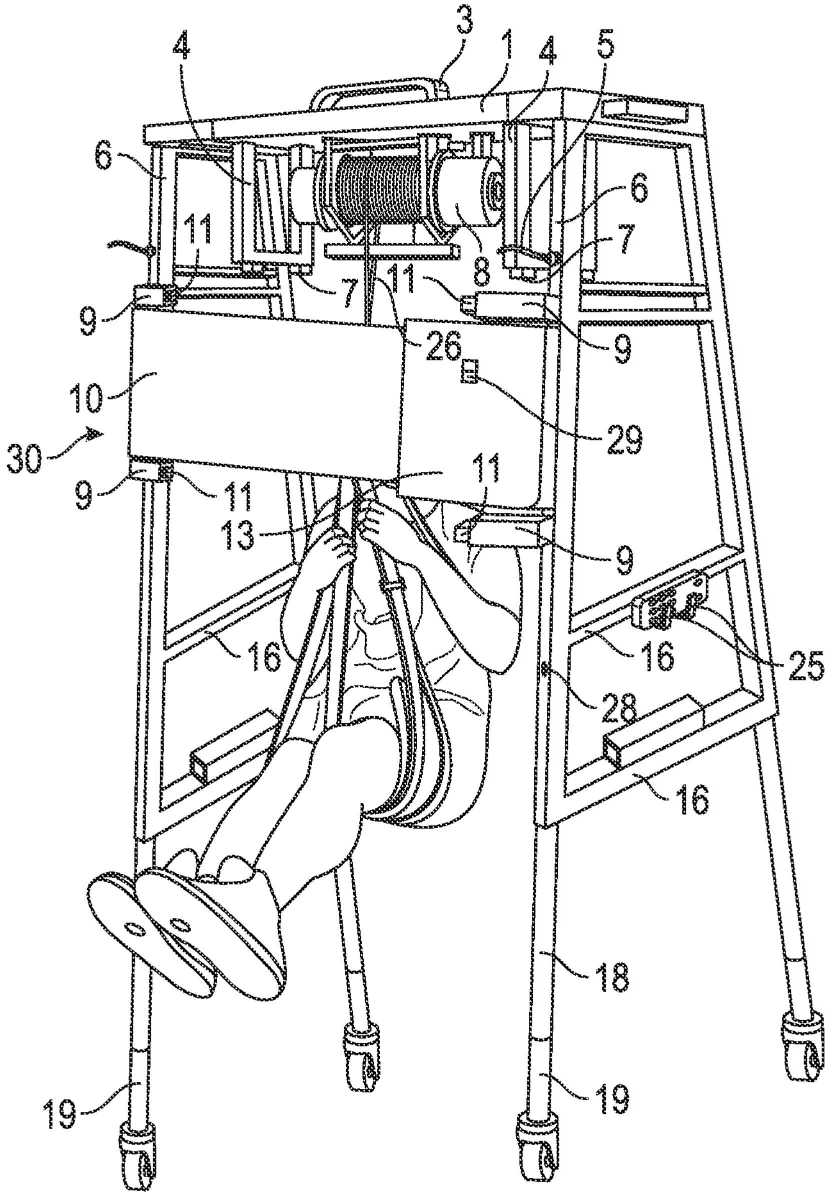
FIG. 5 is a perspective view of the lifting device illustrated in FIG. 1 in a horizontally collapsed position and a vertically extended position and in use to suspend a person above the ground.

Referring now specifically to FIGS. 1, 3 & 4, the lifting device 27 may comprise overlay members 17 connected to the upper area of one or more of the lower connecting support members 16 and oriented parallel to the connecting support member 16 the overlay member 17 is connected to. The overlay members 17 may, for example, be used to receive a bench seat member (not shown) so that the hoist can be used to allow a patient being moved to sit while the lifting device is being used. For example, when the bench seat member is installed to be connected to the overlay members 17, the lifting device may be used to move a patient from a bed to a shower, allow the patient to be in a seated position in the shower, and remain connected to the seat member 23 to reduce a chance of falling.

Referring to FIGS. 1, 3-5, & 7, the lifting device 27 may illustratively include a number of leg members 18. Each leg member 18 may be configured to matingly slide into the lower portions of each side member 6. As perhaps best illustrated in FIG. 7, the leg members 18 are positioned to extend outwardly from each side member 6. Throughout the front facing areas of each side member 6 there may be a plurality of through holes 28 that may be used as locking mechanisms to configure the length of the leg members 18 and thus configure the height of the lifting device 27. In some embodiments, the lock mechanism in place at the through holes 28 can be a push button type lock that can be unlocked upon depression and remain locked when the button becomes raised upon ceasing depression. Alternatively, the through hole 28 locking mechanism may be a locking pin, which can be inserted once the through holes 28 align on the side member 6 and the leg member 18 in order to configure the height of the lifting device 27 by preventing longitudinal movement of the leg member 18. Other lock mechanisms may also be provided, as may be understood by those skilled in the art while still accomplishing the goals, features and advantages according to embodiments of the present invention. Moreover, the ability to raise or lower the height of the lifting device 27 advantageously allows the user to ensure the invention will be at the most convenient height given the embodied invention's intended use. For example, extending the length of the leg member 18 to a greater length advantageously allows for ease of use of the lifting device 27 over objects, such as furniture, as illustrated in FIG. 3.

The leg members 18 may also include a foot connection member 19 adapted and connected on the lower portion of each said leg member 18. This is illustratively shown in FIGS. 1, 3-5, 7, & 9. This advantageously provides enhanced stability to the lifting device. In other words, the foot connection members 19 may each have a flat configuration that may provide a more stable surface to support the lifting device 27. Those skilled in the art will appreciate that the foot connection members 19 may be inserted into a bottom portion of each of the leg members 18. Alternatively, the foot connection members 19 may be threadedly connected to the leg members 18. Those skilled in the art will appreciate that there are many configurations for connecting the foot connection members 19 to the leg members 18, and each configuration that is suitable for connecting the foot connection members 19 to the leg members 18 is contemplated and intended to be included within this disclosure.

In an alternative embodiment, the foot connection members 19 may be provided by casters or other wheeled devices. Using casters advantageously allow the lifting device 27 to be readily moved after a patient has been lifted. For example, it may be desirous to lift a patient from one location and move the patient to another area simply by moving the lifting device 27 that has casters as the foot connection members 19. This advantageously provides enhanced operation of the lifting device and allows for the lifting device 27 to be used to readily move patients while simultaneously reducing the risk of injury to persons that may be necessary to lift the patient.

The lifting device 27 may also include a seat member 23 that may be attached to the lifting device 27 with the load member 26 as illustratively shown in FIGS. 3-5, and 7. A plurality of different types of seat members 23 may be used with the lifting device 27 depending on the proportions of the person to be lifted or depending upon the desired physical manipulation of the person under the current circumstances. For example, in certain situations a certain type of seat member 23 may be more desirous to lift a large person, or a different type of seat member may be more desirous if the goal is to simply lift the person to rotate them to be on his or her side. Those skilled in the art will appreciate that many different types of seat members 26 can be used while still accomplishing the goals, features, and objectives according to embodiments of the present invention.

Referring now to FIGS. 3-5, & 7, the operation of the lifting device 27 is now described in greater detail. If, for example, a patient is on the ground (or floor) and needs to be lifted therefrom, the lifting device 27 according to the present invention may be used to achieve such a task. More specifically, a seat member 23 can be engaged onto or around the patient or person that needs to be lifted from the ground. Upon engaging the seat member 23, the seat member then may be attached to the load member 26. Upon attaching the seat member 23 to the load member 26, a user may then operate the hoist assembly 8 to being rotating the coiled member 22 such that the load member 26 wraps around the coiled member 22. As the load member 26 wraps around the coiled member 22 the load member's 26 portion unwound shortens resulting in the seat member 23, and thus also the patient that the seat member is engaged upon, to be lifted above the ground.

Figure 10:
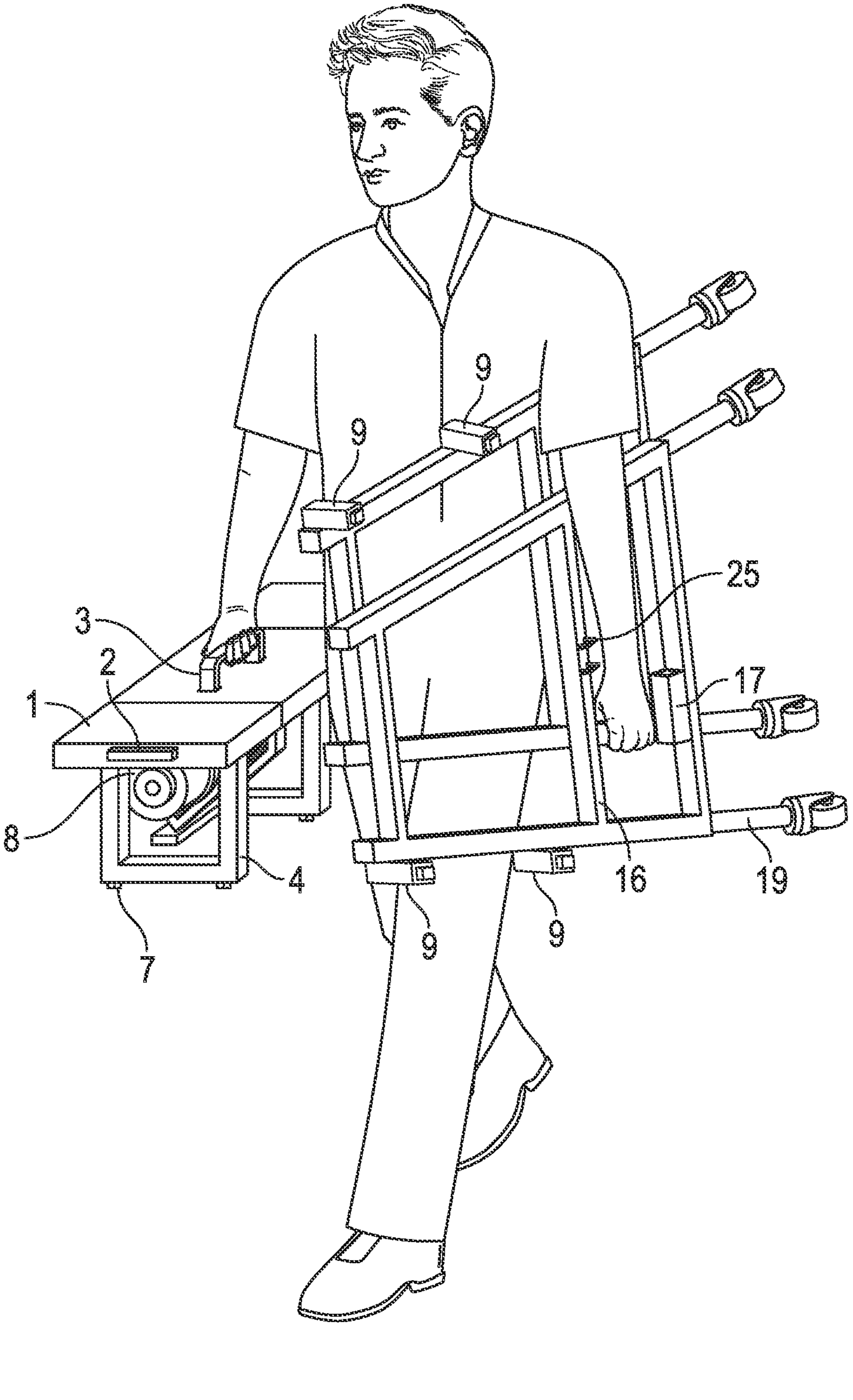
FIG. 10 is a perspective and environmental view of the lifting device illustrated FIG. 1 in a disassembled state and being carried by a person.
Figure 11:
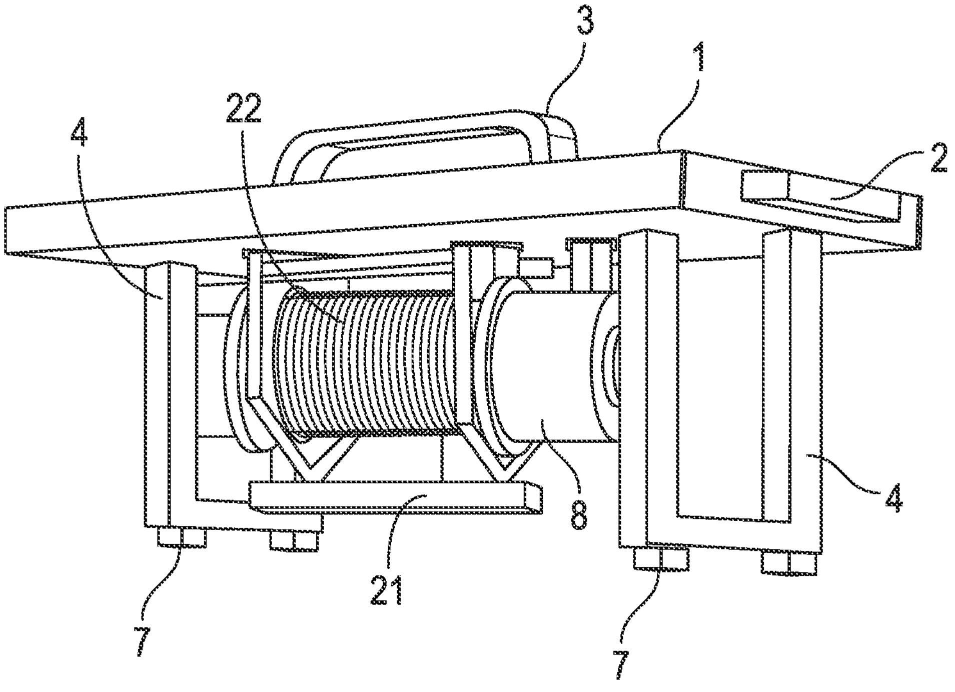
FIG. 11 is a perspective view of the upper portion of the lifting device illustrated in FIG. 1 in a fully collapsed state.
Figure 12:
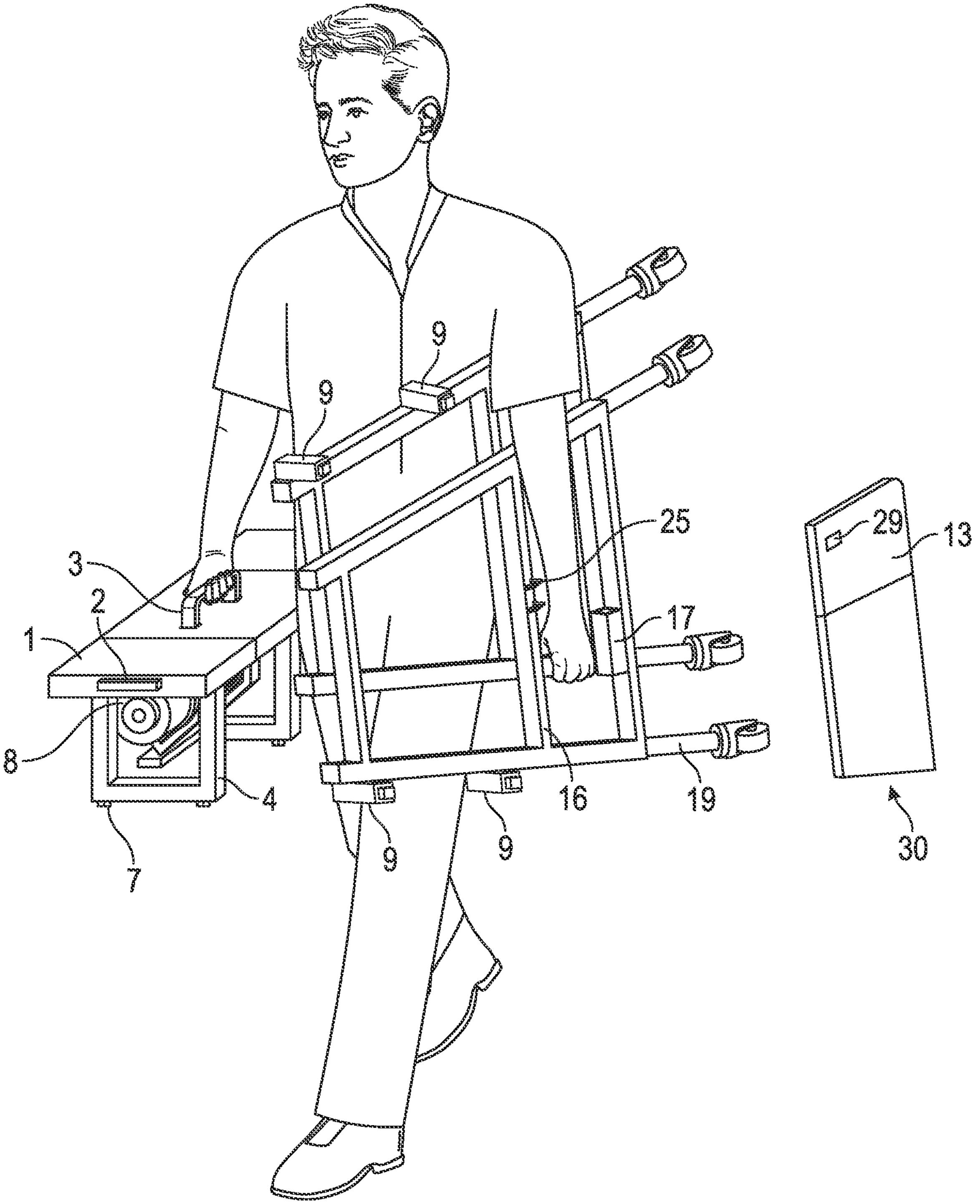
FIG. 12 is an exploded perspective and environmental view of the lifting device illustrated in FIG. 1 that is disassembled and being carried by a person with an illustration of the placement of a front shield member on the lifting device.

The lifting device 27 is advantageously configured for convenient setup and transportation. Referring more specifically to FIG. 10, the lifting device 27 may be disassembled and the leg members 6 may advantageously be configured to be flat for easier transportation. The top member 1 may conveniently be collapsed by a user when the lifting device 27 is disassembled. This advantageously provides for a more convenient form for which the top member 1 can be transported. Referring additionally to FIG. 11, transportation of the top member 1 is further made convenient when the carry handle member 3 is placed on the top side of the top member 1. The carry handle member 3 may provide a convenient way for a user to grip and carry the top member 1 when the lifting device 27 is disassembled. Furthermore, the front shield member 30 may also be collapsed to be in a more convenient travel form as illustrated in FIG. 12. Those skilled in the art will appreciate that it is not necessary to disassemble or collapse the lifting device 27 for transportation, and that the lifting device 27 is able to be transported in its fully assembled or uncollapsed form if needed.

Figure 6:
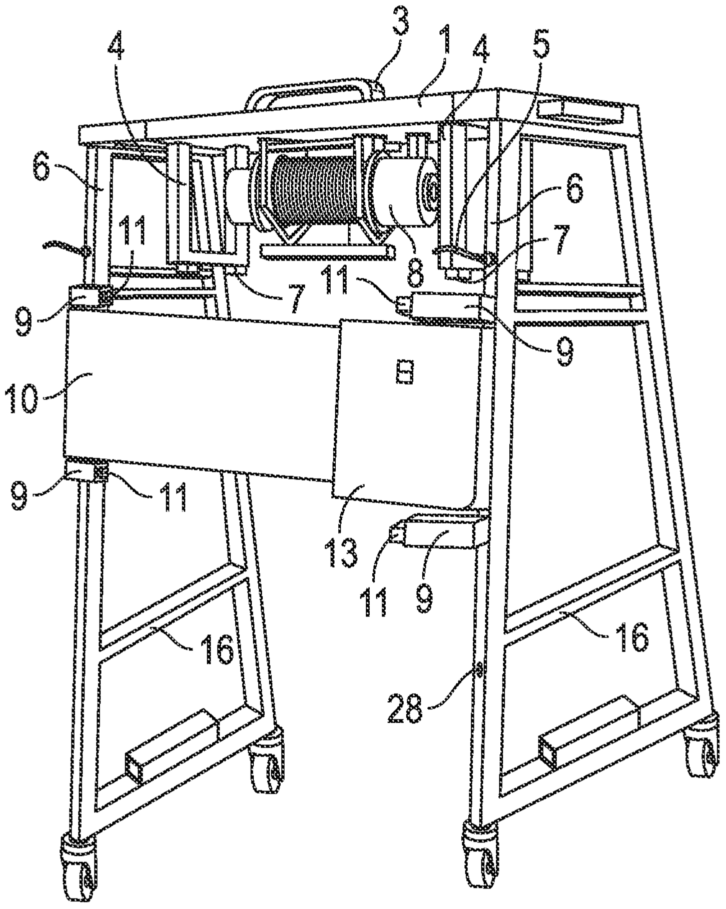
FIG. 6 is a perspective view the lifting device illustrated in FIG. 5 in a horizontally collapsed position and a vertically collapsed position.
Figure 7:
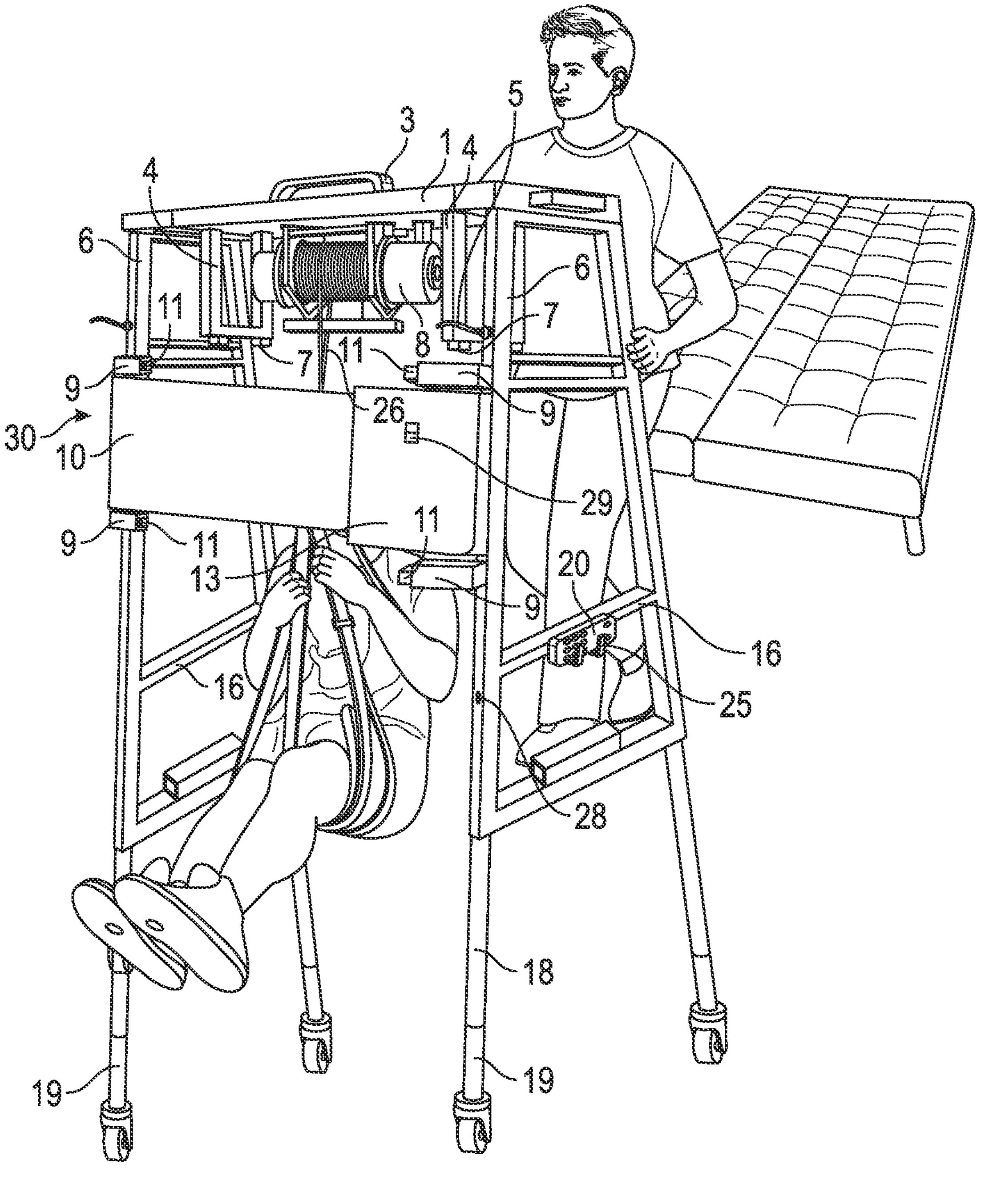
FIG. 7 is a perspective and environmental view of the lifting device illustrated in FIG. 1 in a horizontally collapsed position and a vertically extended position being used to suspend a person above the ground while another person (or user) pushes and wheels the lifting device while the person is suspended.
Figure 8:
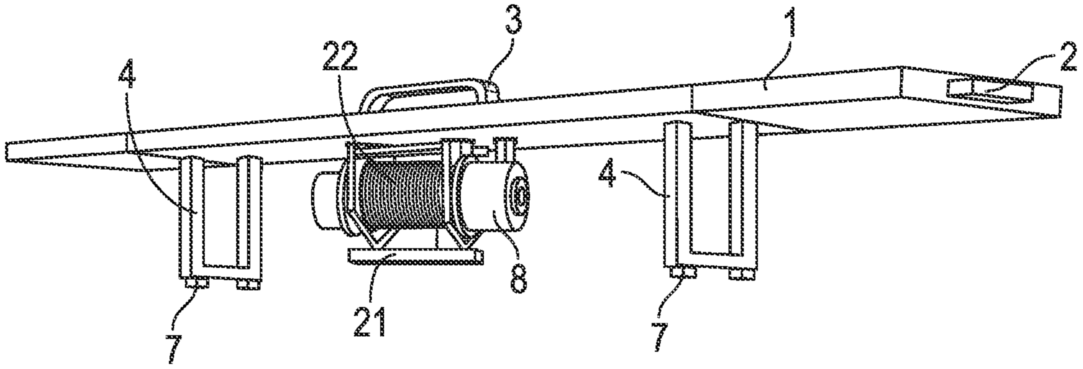
FIG. 8 is a perspective view of an upper portion of the lifting device illustrated in FIG. 1 and in the horizontally extended position.
Figure 9:
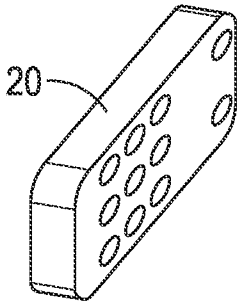
FIG. 9 is a perspective view of a remote of the lifting device illustrated in FIG. 1.

Alternatively, the lifting device 27 may be transported in a fully assembled but fully collapsed form as illustrated in FIG. 6. This form is best suited when the lifting device is stored, but it is not found necessary to disassemble the lifting device 27. For example, in a hospital emergency room is may be found necessary to keep the lifting device 27 collapsed but assembled for the hospital personnel to have a faster response time when a patient has fallen onto the floor and is under emergency conditions.

As illustrated in FIG. 4, use of the hoist member 8 is optional to carry a patient around using the lifting device 27. If necessary, the seat member 23 being used with the lifting device 27 can be attached to other members (not shown) on the lifting device. For example, this may be desired when a large patient is capable of standing upright but is unable to walk (or has trouble walking), and the patient is too large to be transported easily by any other mode of transportation.

The components of the lifting device 27 according to embodiments of the present invention may advantageously be made with aluminum material. An aluminum material may be advantageous as it has high strength properties and low weight. Those skilled in the art will appreciate, however, that the lifting device 27 components may be made of any number of materials while still composting the goals, features, and objectives according to the present invention.

Now referring to FIGS. 13-15, details on some improved embodiments of the lifting device 27 may now be described. Embodiments of the present invention may include side members 6, top support members 1, hoist assemblies 8, and a front shield member 30. The side members 6 may be movable between a collapsed position and an extended position. In some preferred embodiments of the present invention, the side members 6 may be telescopically movable between the collapsed position and the extended position. Each side member 6 may include one or more leg members 18 which may be extending in parallel with one another. Each leg member 18 may be movable between a collapsed position and an extended position, and each leg member 18 may also be telescopically movable between the collapsed position and the extended position. Each side member 6 may also include one or more connecting support members 16. The connecting support members 16 may be extending between two or more of the leg members 18 of one of the side members 6. Each connecting support member 16 may have one end connected to a leg 18 of a side member 6 and another end connected to another leg 18 of the same side member 6. Each connecting support member 16 may be positioned horizontal to the leg members 18 that the connecting support member 16 is attached thereto.

One or more of the connecting support members 16 may include an engagement member 1310. The engagement member 1310 may be operable to move between an engaged position and a released position. When the engagement member 1310 is in the engaged position, the engagement member 1310 may prevent the leg members 18 and/or the side member 6 that is it attached thereto from moving and/or telescopically moving between the collapsed position and the extended position. When the engagement member 1310 is in the released position, the engagement member 1310 may be configured to allow the leg members 18 and/or the side member 6 that is it attached thereto from moving and/or telescopically moving between the collapsed position and the extended position. In some embodiments of the present invention, without limitation, the engagement member 1310 may comprise a button that when pressed, may move the engagement member 1310 to the released position, and that when the engagement member 1310 button is not being pressed, the engagement member 1310 may automatically move to the engaged position.

In some embodiments of the present invention, the engagement member 1310 may comprise an electronic actuator, such as, and without limitation, a solenoid. The engagement member 1310 may be in communication with a control unit 1702 and/or with a power unit 1304, and the engagement member 1310 may be operable to the selectively controlled with the control unit 1702 to move the engagement member 1310 between the engaged position and the released position. Further details on the control unit 1702 and the power unit 1304 follows below.

In some embodiments of the present invention, each side member 6 may include a connecting support member 16 on each portion of the side member 6 and/or on each portion of the legs 18 of the side member 6 that telescopically moves. In embodiments that include multiple connecting support members 16, one or more of the connecting support members 16 of each side member 6 may include an engagement member. For example, without limitation, each side member 6 of the lifting device 27 may include two connecting support members 16, and a lower one of the two connecting support members 16 may include an engagement member 1310, as illustrated in FIG. 13.

Figure 16:
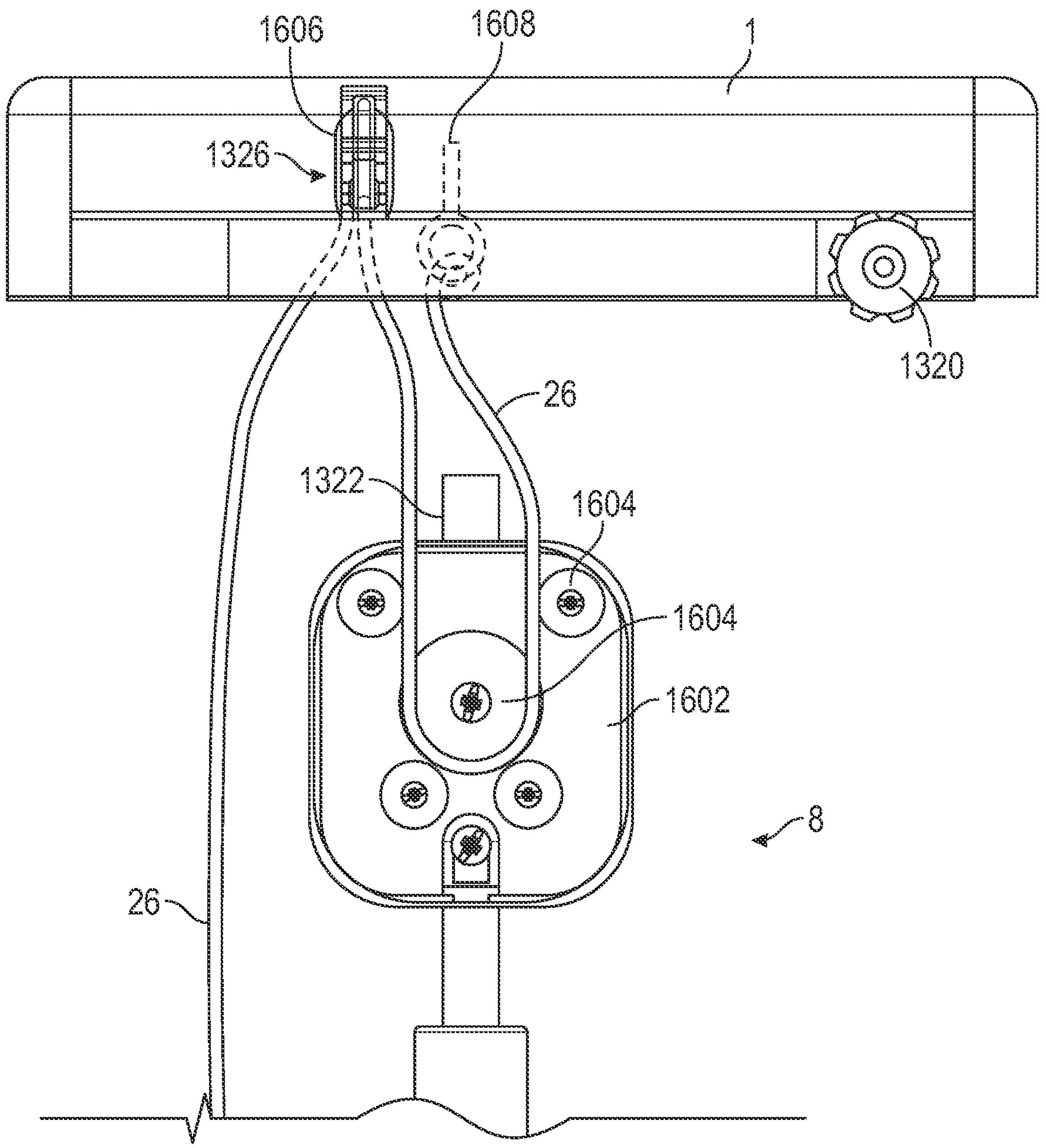
FIG. 16 is a partial schematic view of the hoist assembly and top support member illustrated in FIG. 13.

Now additionally referring to FIG. 16, each of the top support members 1 may be carried by and/or connected to a respective side member 6. The top support member 1 may be positioned at an upper portion of its respective side member 6. In some embodiments of the present invention. the top support member 1 may be extending between and attached to the upper portion of two or more legs 16 of its respective side member 6. The top support members 1 may cooperatively carry a load member 26. One end of the load member 26 may be carried by one of the top support members 1 and another end of the load member 26 may be carried by another one of the top support members 1. In some embodiments of the present invention, the top support members 1 may include a retention member 1608 carried thereby and to which one of the ends of the load member 26 may be attached. The top support members 1 may also include a top pulley 1606 carried thereby and to which the load member 26 may be slidingly carried thereby. Further details on the retention members 1608, top pulleys 1606 and the load member 26 follows below.

The front shield member 30 may be extending between the side members 6, and in some embodiments of the present invention, the front shield member 30 may be extending between the side members 6 at an upper portion of the side member 6. The front shield member 30 may be extending between the leg members 18 of the side members 6 and/or extending between one of the leg members 18 of each side member 6. Also, the front shield member 30 may be positioned extending between an upper portion of the leg members 18 and/or of one of the leg members 18 of each side member 6.

The front shield member 30 may be pivotally attached at one end to one of the side members 6 and/or to one of the leg members 18, and the front shield member 30 may be pivotally attached at a second end to another one of the side members 6 and/or to one of the leg members 18. The front shield member 30 may be movable between an extended position and a collapsed position. The collapsed position of the front shield member 20 may be defined as when the front shield member 30 is at least partially folded in on itself, and the extended position of the front shield member 20 may be defined as when the front shield member 20 is substantially uniformly coplanar with a two dimensional plane. In some embodiments of the present invention, the front shield member 30 may comprise a first shield member 10 and a second shield member 13 that may have one side pivotally attached to a side of the first shield member 10. The first shield member 10 and the second shield member 13 may have a substantially similar and/or same size and/or shape. The collapsed position of the front shield member 30 may be defined as when the first shield member 10 and the second shield member 13 are pivotally moved in relation with one another to have a frontal face of each to be substantially facing one another.

The extended position of the front shield member 30 may be defined as when the first shield member 10 and the second shield member 13 are pivotally moved to have the frontal face of each to be aligned with one another along a two-dimensional plane and/or to have the frontal face of each of the first shield member 10 and the second shield member 13 to be substantially not facing one another. It is understood that the recitation of the frontal face of each of the first shield member 10 and the second shield member 13 to be substantially not facing one another means that a two-dimensional linear projection outwards from the frontal face of the first shield member 10 and of the second shield member 13 would not project onto the frontal face of one another. Further details on the front shield member 30, the first shield member 10, and the second shield member 13 follows below. For the purposes of increasing the level of terseness of the description of the present invention, the term front shield member 30 may be used to refer to any one or more of the front shield member 30, the first shield member 10, and/or the second shield member 13 individually, in combination, or in any combinations thereof without any limitation intended or implied thereby.

Some embodiments of the present invention may include one or more of a side handle 2 and a carry handle member 3, which me be referred to herein separately and/or collectively, without limitation, as handle member(s) 2, 3 and in any grammatical form thereof. The handle member(s) 2, 3 may be positioned on and/or attached to one or more portions of the top support member(s) 1, the side members 6, and the leg members 18. In some embodiments of the present invention, the handle member(s) 2, 3 may be positioned on and/or attached to one or more of the connecting support members 16. However, it is contemplated that the connecting support member 16 may act as a handle without the need of a handle member 2, 3 positioned on and/or attached thereto.

Although throughout the figures that handle member(s) 2, 3 may be illustrated as handles comprising a rigid material, such as, and without limitation, a metal plastic, and/or composite, it is contemplated that the handle member(s) 2, 3 may comprise a less-than-rigid or non-rigid material. For example, without limitation, the handle member(s) 2, 3 may comprise a less-than-rigid material and/or a non-rigid material such as, and without limitation, a non-rigid handle comprising one or more of textiles, cloth, woven fiberglass, resins, polymers, and any combinations thereof and any other material that may be used for the handle member(s) 2, 3 as may be understood by those who may have skill in the art. Those skilled in the art may notice and appreciate that the handle member(s) 2, 3 may allow for ease of handling, manipulation, travel, and manual movement of embodiments of the lifting device 27 when the lifting device 27 is in either the collapsed position or the extended position. However, those skilled in the art will notice and appreciate that embodiments of the lifting device may include none, or any number of handle member(s) 2, 3 which may also comprise any material while still accomplishing all the goals, features, and advantages of the embodiments of the present invention.

Figure 13:
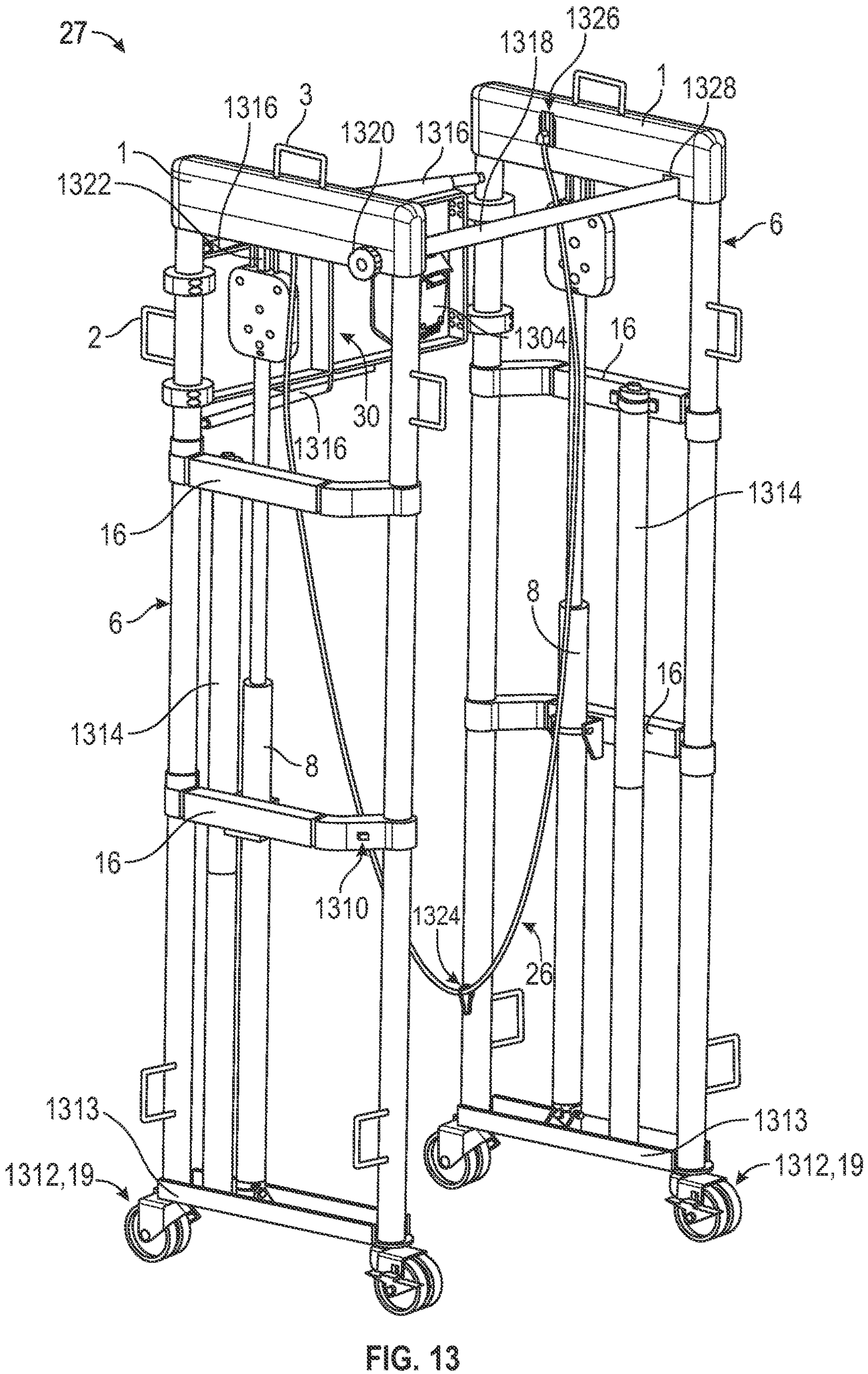
FIG. 13 is a perspective view of a lifting device according to the present invention, shown with hoist assemblies and top support members and in the extended position.
Figure 14:
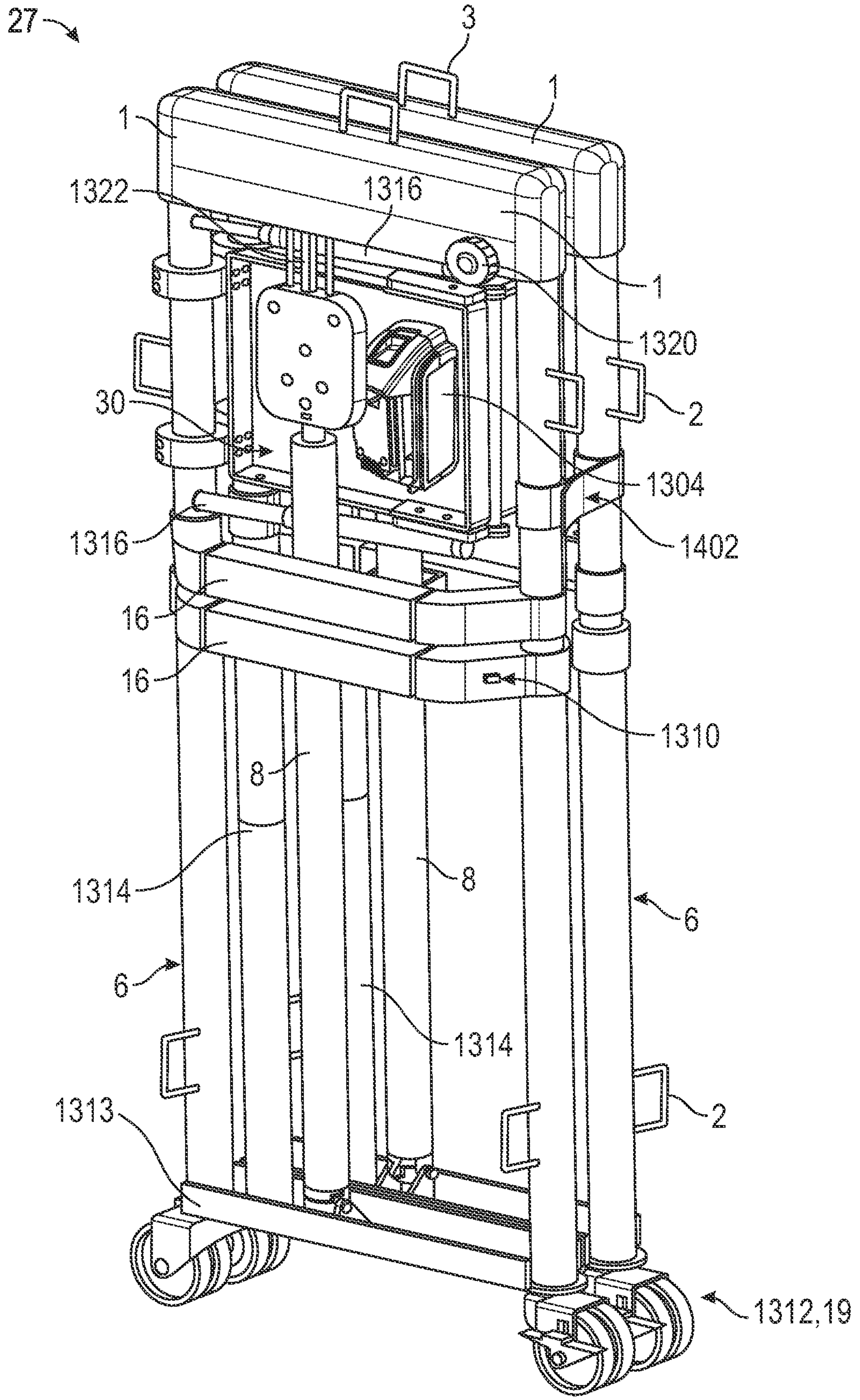
FIG. 14 is a perspective view of the lifting device illustrated in FIG. 13 in the collapsed position.
Figure 15:
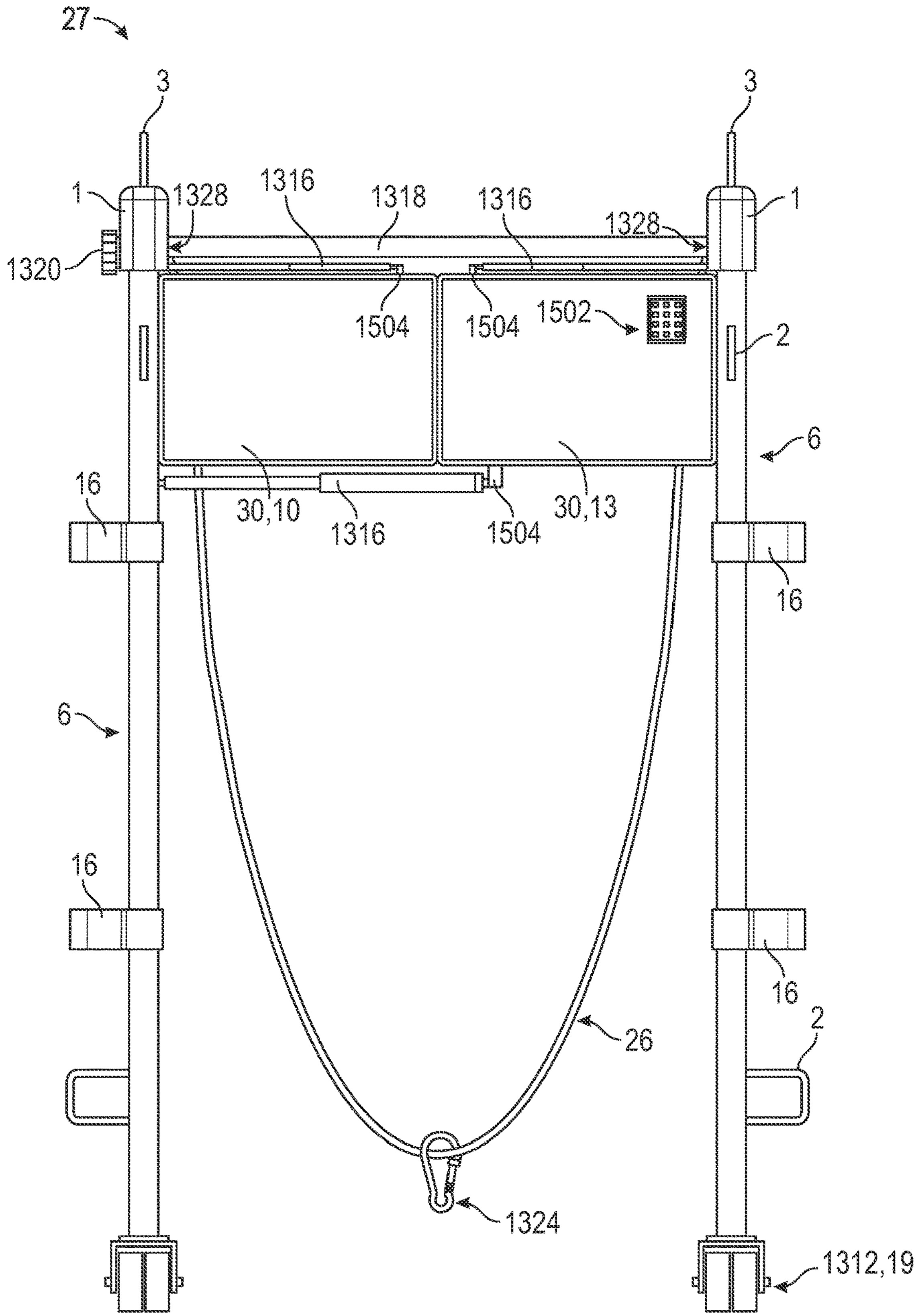
FIG. 15 is a schematic diagram of the lifting device illustrated in FIG. 13.

Continuing to refer to FIGS. 13-15, embodiments of the present invention may include one or more piston members 1316. The piston members 1316 may comprise a first end and a second end. The first end of the piston members 1316 may be attached to and/or pivotally connected to one of the side members 6 and/or one of the leg members 18, and the second end of the piston members 1316 may be attached to and/or pivotally connected to a side portion of the front shield member 30 and/or a side portion of the first shield member 10 and/or a side portion of the second shield member 13. The piston members 1316 may be configured to generate an extend force and/or to generate a collapse force. The extend force of the piston members 1316 may be defined as a force applied by the piston member 1316 between the side member 6/leg member 18 and the front/first/second shield member 30, 10, 13 that the piston member 1316 is attached to and/or pivotally connected to extend the piston member 1316 to an extended position and to move the front/first/second shield member 30, 10, 13 to the extended position. The collapse force of the piston members 1316 may be defined as a force applied by the piston member 1316 between the side member 6/leg member 18 and the front/first/second shield member 30, 10, 13 that the piston member 1316 is attached to and/or pivotally connected to collapse the piston member 1316 to a collapsed position and to move the front/first/second shield member 30, 10, 13 to the collapsed position.

In some embodiments of the present invention, the piston members 1316 may be configured to selectively generate and/or continually generate the extend force and/or the collapse force. In some other embodiments of the present invention, the piston members 1316 may be configured to be operable to selectively generate the extend force and/or the collapse force. Examples of the piston members 1316 include, without limitation, pneumatic, hydraulic, electrical, and/or mechanical pistons, actuators, struts, solenoids, and/or motors, and any combinations thereof and/or any other device that may be used as a piston member 1316 as described herein by those who may have skill in the art. For the purposes of the present invention, it should be understood that the movement of the piston members 1316 between the extended position and the collapsed position may be referred to, without limitation, as the piston members 1316 actuating between the extended position and the collapsed position.

In some embodiments of the present invention, an end of the piston member 1316, such as the second end of the piston members 1316, may be attached to and/or pivotally connected to the side portion of the front shield member 30 and/or the side portion of the first shield member 10 and/or the side portion of the second shield member 13 via a piston attachment member 1504. The piston attachment member 1504 may be configured to allow the piston member 1316 to be attached to, and pivotally move relative to, the side portion of the front shield member 30 and/or the side portion of the first shield member 10 and/or the side portion of the second shield member 13 that the second end of the piston member 1316 is attached therewith via the piston attachment member 1504. In some embodiments of the present invention, without limitation, the piston attachment member 1504 may be configured to allow for the second end of the piston member 1316 to slidingly move along the side of the front/first/second shield member 30, 10, 13 that the second end of the piston member 1316 is attached therewith via the piston attachment member 1504.

Some embodiments of the present invention may include a bar member 21 that may extend between the top support members 1. The bar member 21 may have two ends that may be each attached to a respective top support member 1. One end of the bar member 21 may be pivotally attached to one of the top support members 1, and the other end of the bar member 21 may be reversibly attached to the other top support member 1. The bar member 21 may comprise a bar connector 1320 at one end of the bar member 21, and the bar connector 1320 may be configured to be reversibly attached and/or removably attached to the respective end of the bar member 21 to one of the top support members 1. In some embodiments of the present invention, the bar member 31 may have two ends that may be each reversibly attached and/or removably attached to respective top support members 1, and the attachment of the two ends to its respective top support member 1 may be via respective bar connectors 1320 at each of the two ends. The bar member 21 may be moveable between a connected position and a stowed position. The extended position of the bar member 21 may be defined as when the bar member 21 is positioned extending between the top support members 1 such that each end of the bar member 21 may be substantially adjacent to at least one of the top support members 1. The collapsed position of the bar member 21 may be defined as when the bar member 21 is positioned such that at least one end of the bar member 21 is not substantially adjacent to at least one of the top support members 1. When the bar member 21 is in the extended position, one end of the bar member 21 and/or the bar connector 1320 of the bar member 21 may be operable to be reversibly attached to a top support member 1 that the end of the bar member 21 is substantially adjacent therewith. When the bar member 21 is in the extended position, the front shield member 30 may be prevented from moving to the collapsed position from the extended position.

Each top support member 1 may include a bar through hole 1328 that may extend into a side portion of the top support member 1. The bar through hole 1328 may be positioned at a lower portion of the top support member 1 such that the bar through hole 1328 may be extending into the top support member 1 from more than one side of the top support member 1. For example, without limitation, the bar through hole 1328 may be extending into a top support member 1 through an interior side and a bottom side of the top support member 1, as illustratively shown with the top support member 1 on the right-hand side in FIG. 13. Those skilled in the art will notice and appreciate that the bar through hole 1328 may be extending into a top support member 1 through an interior side and a bottom side of the top support member 1 may allow for the bar member 1318 with an end attached to the top support member 1 via this bar through hole 1328 to pivotally move about the bar through hole 1328 and the top support member 1 such that the bar member 1318 may pivotally move to the collapsed position and be substantially positioned between and substantially parallel with the leg members 18 of the side member 6 carrying the top support member 1 while in the collapsed position.

The bar through hole 1328 may also be positioned extending through a majority and/or extending entirely through a top support member 1. For example, without limitation, the bar through hole 1328 may extend entirely through a lower portion of a top support member 1 from an interior side to an exterior side of the top support member 1 as illustratively shown with the top support member 1 illustrated on the left-hand side in FIG. 13. The bar through hole 1328 may extend through a lower portion of a top support member 1 from an interior side to an exterior side of the top support member 1 such that the bar through hole 1328 forms a lower channel along a lower portion of the top support member 1 from the interior side to the exterior side of the top support member 1. Those skilled in the art may notice and appreciate that the lower channel formed in the top support member 1 may allow for the first end of the bar member 1318 to be pivotally and/or pivotally moved about the second end of the bar member 1318, which is pivotally attached to a lower portion and/or bar through hole 1328 of another top support member 1, such that the bar member 1328 may be aligned with the same horizontal plane with the top support members 1 when the bar member 1328 is in the extended position.

When the reversible attachment of the end of the bar member 21 and/or of the bar connector 1320 to a top support member 1 is reversed and/or detached, the bar member 21 may be allowed to move to the collapsed position, and may allow for the bar member 21 to pivotally move and/or pivotally move about an end of the bar member 21 that may be pivotally attached to the other top support member 1. For example, without limitation, When the reversible attachment of the end of the bar member 21 and/or of the bar connector 1320 to a top support member 1 is reversed and/or detached, the bar member 21 may pivotally move and/or pivotally move about the end of the bar member 21 pivotally attached to the other top support member 1 such that the bar member 21 may be positioned substantially parallel with the side members 6 and/or the leg members 18. The bar connector 1320 may comprise a knob that may be operable to reversibly and fixedly attach itself and/or the respective end of the bar member 21 to one of the top support members 1.

Some embodiments of the present invention may comprise one or more foot connection members 19. The foot connection members 19 may be positioned at a lower portion of the side members 6 and/or at a lower portion of the leg members 18 of the side members 6. Each foot connection member 19 may comprise a wheel member 1312, such as, without limitation, a castor, a wheel, a wheel assembly, a wheel lock, a castor lock mechanism, and/or a wheel motor. The wheel lock and/or the castor lock may be operable to prevent the wheel member 1312 from rotatably moving. However, it is contemplated that the foot connection members 19 may not comprise a wheel or castor and may comprise a grip foot such as, without limitation, a rubber foot, a latex foot, and/or a composite foot which may have a relatively high static coefficient of friction and/or a relatively high sliding coefficient of friction. Further details on the foot connection members 19 and the wheel members 1312 follows below.

Some embodiments of the present invention may include one or more of a lock member 1402 as illustrated in FIG. 14. The lock member 1402 may be pivotally connected to a side member 6 and/or to a leg member 18 of a side member 6. The lock member 1402 may include a lock end that may be sized and configured to be reversibly attached to another side member 6 and/or to another leg member 18 of another side member 6. The lock member 1402 may be operable to be pivotally moved between a locked position and an unlocked position. The unlocked position of the lock member 1402 may be defined as when the lock end is not reversibly attached to a side member 6 and/or a leg member 18 of a side member 6. The locked position of the lock member 1402 may be defined as when the lock end of the lock member 1402 is reversibly attached to a side member 6 and/or a leg member 18 of a side member 6. The lock member 1402 may be sized and configured to only be allowed to move to the locked position when the front/first/second shield member(s) 30, 10, 13 is/are moved to the collapsed position such that the side members 6 and/or leg members 18 of the side members 6 are a distance from one another that may be close to and/or about equal to a length between the lock end and the end of the lock member 1402 that is pivotally attached to a side member 6/leg member 18. When the lock member 1402 is in the locked position, the front/first/second shield member(s) 30, 10, 13 may be prevented from moving to the extended position from the collapsed position.

Some embodiments of the present invention may comprise one or more hoist assemblies 8. In some preferred embodiments of the present invention, the lifting device 27 may comprise a number of hoist assemblies 8 equal to the number of side members 6 of the lifting device 27. For example, without limitation, the lifting device 27 may comprise two side members 6 and two hoist assemblies 8 as illustrated in FIG. 13. Each hoist assembly 8 may be carried by a respective side member 6. The hoist assembly 8 may be positioned between and parallel with the leg members 18 of the respective side member 6 that the hoist assembly 8 is carried thereby. Each side member 6 may comprise a lower support 1313 positioned at a lower portion of the side member 6. The lower support 1313 may extend between the leg members 18 of the side member 6 and the lower support 1313 may be connected to a lower portion of each leg member 18 of the side member 6 and to a lower portion of the hoist assembly 8 carried by the side member 6. The lower support 1313 may also be connected to, rotatably attached to, and/or pivotally attached to one or more of the foot connection members 19 and/or to one or more of the wheel members 1312. The foot connection members 19 and/or the wheel members 1312 may also be connected to, rotatably attached to, and/or pivotally attached to one or more of the leg members 18 and/or the side members 6. The foot connection members 19 and/or the wheel members 1312 may be configured to swivel with respect to the lower support 1313, leg member 18, and/or side member 6 that the foot connection member 19/wheel member 1312 is connected/attached thereto.

The hoist assemblies 8 may be operable to be moved between and/or actuated between an extended position and a collapsed position. The collapsed position of the hoist assemblies 8 may be defined as when the hoist assemblies 8 are operably moved and/or operably actuated to have a total height that is equal to and/or less than a distance between a lower portion of the top support member 1 and the lower support 1313 when the respective side member 6 and/or the leg members 18 of the respective side member 6 are in the collapsed position. The extended position of the hoist assemblies 8 may be defined as when the hoist assemblies 8 are operably moved and/or operably actuated to have a height that is shorter by a predetermined amount than the distance between the lower portion of the top support member 1 and the lower support 1313 when the respective side member 6 and/or the leg members 18 are in the extended position. The hoist assemblies 8 may include, without limitation, one or more of a hydraulic actuator, a pneumatic actuator, an electric actuator, an electromechanical actuator (EMA), an electrohydraulic actuator, a motor, linear motor, a rotary motor, a thermal actuator, a magnetic actuator, a mechanical actuator, a soft actuator, a gear, a cog, a spring, a pulley, a chain, a rope, a tie, a belt, and any combinations thereof.

Each hoist assembly 8 may comprise a bumper 1322 and/or a pulley member 1602. The pully member 1602 may be positioned at an upper end of the hoist assembly 8. The bumper 1322 may be positioned at and/or connected to an upper end of the hoist assembly 8 and/or the bumper 1322 may be positioned at and/or connected to an upper portion of the pulley member 1602. The bumper 1322 may have a height substantially equal to the predetermined amount of heigh difference between the lower portion of the top support member 1 and the lower support 1313 when the respective side member 6 and/or the leg members 18 are in the extended position. When the hoist assemblies 8 are operably moved and/or operably actuated from the collapsed position to the extended position, the hoist assemblies 8, the pulley members 1602 of the hoist assemblies 1602, and/or the bumper 1322 of the hoist assemblies 8 may apply a force against the lower portion of the top support members 1 to move the side members 6 and/or the leg members 18 to the extended position.

When the side members 6 and/or the leg members 18 are moved to the extended position, the engagement members 1310 may automatically move to the engaged position, and/or the engagement members 1310 may be operable to move to the engaged positioned from the released position. In preferred embodiments of the present invention, the hoist assemblies 8 are operably moved and/or operably actuated between the collapsed position and the extended position together in unison and/or synchronously. However, it is contemplated that the hoist assemblies 8 may by operably moved and/or operably actuated between the extended and collapsed position alternatingly, asynchronously, and/or separately. Each hoist assembly 8 may comprise, without limitation, a Linear Actuator, a Pneumatic Actuator, a Hydraulic Actuator, an Electric Actuator, a Rod Actuator, and/or Rod-less Actuator, and any combination thereof.

Now referring to FIGS. 13 and 16, the pulley member 1602 of each hoist assembly 8 may be in communication with at least a portion of the load member 26. Embodiments of the present invention may include one or more pulley units 1604 that may be and rotatably carried within each pulley member 1602. The pulley units 1604 may be positioned within each pulley member 1602 to be in communication with at least a portion of the load member 26. Each the pulley unit 1604 may be positioned and configured to rotatably move about a mid-axis thereof and to guide and rotatably grasp at least a portion of the load member 26 within the pulley member 1602. Each pulley unit 1604 may comprise, without limitation, a bearing such as a pulley bearing and/or a roller bearing.

Now additionally referring to FIG. 15, embodiments of the present invention may include one or more of an attachment member 1324. The attachment member 1324 may be attached to and/or carried by a portion of the load member 26. In some embodiments of the present invention, the attachment member 1324 may be reversibly attached to and/or removably carried by the load member 26. The attachment member 1324 may be configured to be reversibly grasp and/or reversibly attached to items, objects, apparatuses, and/or articles, such as and without limitation, a harness, a restraint, a seat, a chair, a bed, and/or a platform, which may be worn, adorned, and/or occupied by a person such as a patient in a medical care facility or person receiving assistance or in the process of receiving of medical attention or care. The attachment member 1324 may comprise, for example, without limitation, a carabineer as illustrated in FIGS. 13 and 15. However, it is contemplated that the attachment member 1342 may comprise any number of attachment devices such as, and without limitation, a harness, a hook, a clasp, a sling, a strap, a quickdraw, maillons, D-rings, a prusiks, an anchor plate, a rope clamp, a load distributor, slipping clutches, and any combinations thereof and any other attachment device that may be used as the attachment member 1324 configured to reversibly grasp and/or reversibly attached to items, objects, apparatuses, and/or articles as may be understood by those who may have skill in the art.

Now referring to FIGS. 13-16, when the side members 6 and/or the leg members 18 are in the extended position, and the engagement members 1310 are in the engaged position, the hoist assemblies 8 may be moveable to the extended position and the collapsed to move the load member 26 between a released position and a retracted position. The retracted position of the load member 26 may be defined as when a mid-section of the load member 26 is positioned substantially between the upper portions of the side members 6. The retracted position of the load member 26 may also be defined as when the load member 26 is substantially extending between the top support members 1. The released position of the load member 26 may be defined as when the mid-section of the load member 26 is positioned substantially between and/or below mid-portions of the side members 6. The released position of the load member 26 may also be defined as when the mid-section of the load member 26 is positioned substantially between and/or below the lower supports 1313 and/or substantially between and/or below the foot connection members 19/wheel members 1312 of each side member 6.

As mentioned above, the load member 26 may have each end thereof carried by a respective top support member 1. A first end of the load member 26 may be attached to a first one of the top support members 1 and/or attached to a retention member 1608 within a first one of the top support members 1. The load member 26 may travel from the first one of the top support members 1 and to and through a portion of a first hoist assembly 8 and/or through a portion of a first pulley unit 1604 of the first hoist assembly 8 that may be carried by the same side member 6, which may be defined as a first side member 6. The load member 26 may travel along and be in communication with one or more pulley units 1604 carried by and/or within the first pulley unit 1604 and/or the first hoist assembly 8 and may travel into and through the first top support member 1 and/or a first top pulley 1606 within the first top support member 1. The load member 26 may travel from the first top pulley 1606 to and through a passage 1326 extending through a side portion of the first top support member 1, which may be defined as a first passage 1326. The load member 26 may travel from the first passage 1326 to a second passage 1326 extending through a second top support member 1 on a second side member 6. The load member 26 may travel from the second passage into and through the second top support member 1 and/or a second top pulley 1606 housed within the second top support member 1.

From the second top pulley 1606, the load member 26 may travel through a bottom portion of the second top support member 1 and to and through a portion of a second hoist assembly 8 and/or through a portion of a second pulley unit 1604 of the second hoist assembly 8 which may be carried by another side member 6, that may be defined as a second side member 6. The load member 26 may travel along and be in communication with one or more pulley units 1604 carried by and/or within the second pulley unit 1604 and/or the second hoist assembly 8 and the load member 26 may travel into the second top support member 1 to such that a second end of the load member 26 may be attached to a second retention member 1608 within the second top support member 1.

Each retention member 1608 may be carried by, housed by, and/or fixedly attached within, a respective top support member 1. The top pulleys 1606 may also be carried by, housed by, and/or fixedly attached within, a respective top support member 1. The top pulleys 1606 may be in communication with a respective portion of the load member 26, and the top pulleys 1606 may each comprise a housing and a movement portion that may rotatably move relative to the top pulley 1606 housing. Examples of the top pulley 1606 include, without limitation, a bearing and housing, and a pully bearing. In some embodiments of the present invention, the top pulleys 1606 may comprise a force application member that applies a rotational force on the movement portion of the top pulley 1606 to rotatably move the movement portion such that the load member 26 may be wrapped around the top pulley(s) 1606 and/or the load member 26 may be moved to the retracted position caused by the rotational force of the force application member(s).

The force application member may apply a rotational force on the movement portion of the top pulley 1606 which may be equal to a predetermined force value such that the load member 26 may be moved to the retracted position when an attachment member 1324 carried by the load member 26 is not attached to an object, harness, article, and/or items listed above that the attachment member 1324 may be reversibly attached thereto. In some embodiments of the present invention, the force application member may be operable to selectively apply a rotational force on the movement member of the top pulley 26 such that the load member 26 may be moved to the retracted position. In yet other embodiments of the present invention, without limitation, the top pulley 1606 may not include a force application member, such that the top pulley 1606 may comprise only a housing and a movement member.

For example, without limitation, the force application member may comprise a constant force member, such as, without limitation, a constant force spring, that may apply a constant force to the movement member of the top pulley 26 to move the load member 26 to the retracted position when the attachment member 1324 carried by the load member 26 is not attached to an object, harness, article, and/or items listed above that the attachment member 1324 may be reversibly attached thereto. For another example, without limitation, the force application member may comprise a selectively controllable force application member, such as and without limitation, a motor or actuator, that may be operable to selectively apply a rotational force on the movement member of the top pulley 26 such that the load member 26 may be moved to the retracted position.

Some embodiments of the present invention may include one or more of a conduits 1314. Each conduit 1314 may be carried by one of the side members 6. The conduit 1314 may be positioned adjacent to and/or parallel with one of the hoist assemblies 8 and/or leg members 18. The conduits 1314 may be movable between a collapsed position and an extended position. The conduits 1314 may comprise telescopic tubing, and the conduits 1314 may be configured to carry wiring therein and therethrough. The wiring carried within and traveling through the conduits 1314 may comprise coiled wiring that may be raveled and unraveled as the conduit 1314 moves between the collapsed position and the extended position.

In some embodiments of the present invention, one or more of the side members 6, the leg members 18, and/or conduits 1314 may be configured to be telescopically movable between the extended position and the collapsed position, and may include one or more of a wiper component positioned between two telescopically movable portions of the side member 6, the leg member 18, and/or conduit 1314. The wiper component may be sized and configured to act as an air gasket to cause the telescopically movable portions to cause a resistance force opposing the movement between the collapsed position and the extended position such that the two telescopically movable portions move at a reduced speed and/or rate than if the two telescopically movable portions were moved between the collapsed position and the extended position without the wiper component.

Figure 17:
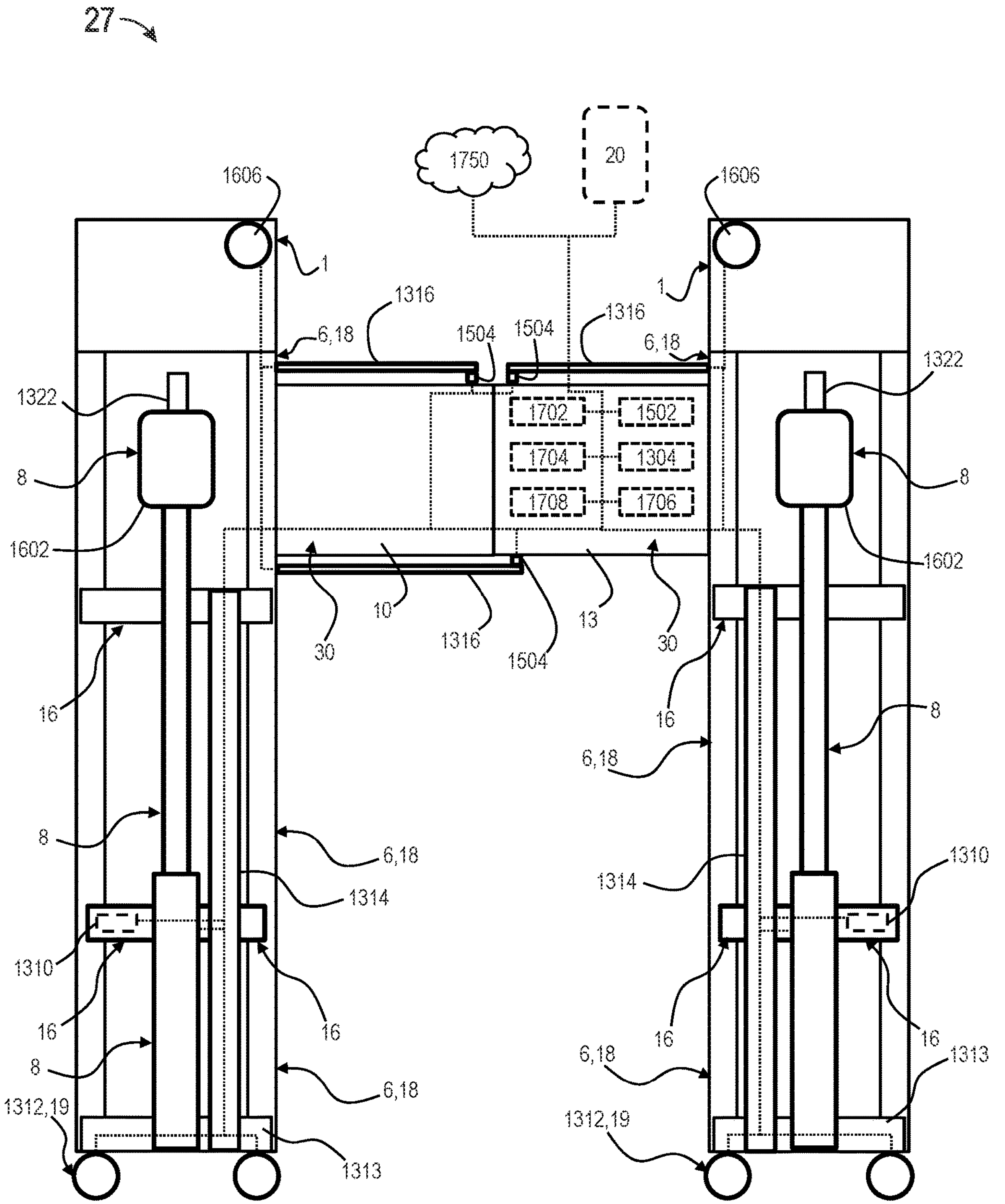
FIG. 17 is a schematic diagram of the lifting device illustrated in FIG. 13, shown in communication with a network and with a remote.

Now additionally but more specifically referring to FIG. 17, some embodiments of the present invention may include one or more a power unit 1304, an input interface 1502, a control unit 1702, a datastore 1704, a memory 1706, and/or a communication unit 1708. The power unit 1304 may be utilized to regulate, supply, and/or provide power, such as electrical power, to one or more components of an embodiment of the lifting device 27. For example, without limitation, the power unit 1304 may be in communication with, and may regulate, supply, and/or provide power to one or more of the hoist assemblies 8, the foot connection members 19, the input interface 1502, the engagement member(s) 1310, the wheel members 1312, the piston members 1316, the top pulleys 1606, the control unit 1702, the datastore 1704, the memory 1706, and/or the communication unit 1708.

For the purposes of the description of the present invention, it should be understood that the term "optionally powered components" may be used to refer to one or more of the hoist assemblies 8, the foot connection members 19, the input interface 1502, the engagement member(s) 1310, the wheel members 1312, the piston members 1316, the top pulleys 1606, the control unit 1702, the datastore 1704, the memory 1706, the communication unit 1708, and/or the power unit 1304 individually, in entirety, and/or in any combinations thereof without any limitation asserted or implied thereby. The power unit 1304 may be carried by the front shield member 30 and/or carried by the first/second shield member(s) 10, 13. However, although it is not illustrated in the figures, it is contemplated and understood that the power unit 1304 may be carried by any other component of an embodiment of the lifting device 27 such as, without limitation, a side member 6, a leg member 18, a lower support 1313, a top support member 1, a connecting support member 16, and/or a hoist assembly 8.

The power unit 1304 may be reversibly engaged, reversibly mounted, and/or reversibly coupled in communication with a power connection (not shown) on the front shield member 30 to regulate, supply, and/or provide power. Although the power connection on the front shield member 30 is not illustrated in the figures, it is understood that power connections to connect a power supply, such as the power unit 1304, is well known in the art such that it does not need further explanation thereof herein. When the power unit 1304 is in communication with the power connection, the power unit 1304 may be in communication with any one or more of the aforementioned components of an embodiment of the lifting device 27 to regulate, supply, and/or provide power thereto.

Examples of the power unit 1304 include, without limitation, a power generator, a battery, a power regulator, an inverter, a rectifier, an electrical fuse, an electrical breaker, and/or a power line utilized to be removably engaged with a power outlet as may be understood by those who may have skill in the art. In some more preferred embodiments of the present invention, the power unit 1304 may comprise a readily available power supply, such as a common power tool power supply, power bank, and/or battery and may be understood by those who may have skill in the art. The power connection of the front shield member 30 may be configured to be reversibly engaged, reversibly mounted, and/or reversibly coupled in communication with a power unit 1304 that comprises a common power tool power supply.

The input interface 1502 may be caried by and/or mounted on the front shield member 30. The input interface may be in communication with one or more of the optionally powered components, such as, without limitation, the control unit 1702. The input interface 1502 may be utilized to emit one or more of an input interface signal upon an input being made with the input interface 1502, such as, without limitation, upon an input made with the input interface 1502 by a user which may be referred to as a user input. Examples of the input interface 1502 may comprise, without limitation, one or more of a button, a key or keypad, a knob, a switch, a dial, a lever, a joystick, a touchpad, a trackball, and any combinations thereof and any other input device that may be used as the input interface 1502 as may be understood by those who may have skill in the art.

In some embodiments of the present invention, the input interface 1502 may include a display that may be in communication with the control unit 1702. The display of the input interface 1502 may be utilized to display one or more status identifiers and information. For example, and without limitation, the display of the input interface 1502 may be utilized to display one or more status identifiers and information including one or more of a load amount on the load member 26, a power status of the power unit 1304, a malfunction identifier, an on status, and an off status.

In some embodiments of the present invention, the input interface 1502 may comprise a receiver, transmitter, and/or transceiver and the input interface 1502 may be operable to be in communication with one or more of a remote 20 and/or user device 20. For the purposes of the description of the present invention, the terms remote 20 and user device 20 may be used interchangeably and may be used to refer to one another individually and/or in combination without any limitation intended or implied thereby. The communication between the input interface 1502 and the user device 20 may be a wired and/or a wireless communication. The communication between the input interface 1502 and the user device 20 may also be via a network 1750 that may be in communication with the input interface 1502, the user device 20, and/or the optionally powered components. The user device 20 may emit a user device input signal based on an input made with and/or via the user device 20. The user device input signal may be received by the input interface 1502 and/or received by one or more of the optionally powered components. Upon the user device input signal being received by the input interface 1502, the user device input signal may interchangeably be referred to as an input interface signal without any limitation implied thereby. The input interface 1502 may send the user device input signal to one or more of the optionally powered components, such as, without limitation, to the control unit 1702. Further details on the input interface input signal and the user device input signal follow below.

The user device 20 and/or remote 20 may comprise, without limitation, one or more of a remote controller, a terminal, a computation device, a laptop, a tablet, a smartphone, a smartwatch, and any combinations thereof and any other device that may be used as the user device 20/remote 20 as described herein as may be understood by those who may have skill in the art. The network 1750 may include, without limitation, one or more of a wireless network, a wired network, a router, a network hub, a network switch, a ethernet connection, a network server, a satellite network, a cellular network, a local access network, a world-wide network, a communication access point, a communication repeater, Bluetooth communication, radio communication, ad-hoc communication, point-to-point communication, and any combinations thereof and any other device, component, and/or network that may be utilized as the network 1750 as described herein as may be understood by those who may have skill in the art.

The communication unit 1708 may be in communication with one or more of the optionally powered components and the communication unit 1708 may be operable to be coupled in communication with the network 1750 and/or the user device 20. Communication between the communication unit 1708 and the user device 20 may be via the network 1750. The communication unit 1708 may be utilized to receive, send, transmit, transceive, manage, facilitate, compute, and/or interpret computer readable information, data, signals, code, commands, and/or executables as may be understood by those who may have skill in the art. Examples of the communication unit 1708 include, without limitation, a network card, a network interface card, a wired or wireless communication adapter, a router, an ethernet connector/connection, a modem, a switch, a bridge, and any combinations thereof and any other device or component that may be utilized as the communication unit 1708 as described herein as may be understood by those who may have skill in the art. It should be understood, that in some embodiments of the present invention the input interface 1502 and the communication unit 1708 may be one and the same such that the input interface 1502 and the communication unit 1708 may have all and/or some of the same features, limitations, and examples listed thereof as one another, such that an embodiment of the present invention may only include an input interface 1502 or a communication unit 1708, and such that the input interface 1502 and the communication unit 1708 may be used to refer to one another interchangeably without any limitation implied thereby.

The datastore 1704 and the memory 1706 may be in communication with one another and the datastore 1704 and/or the memory 1706 may be in communication with one or more of the optionally powered components, such as, without limitation, the control unit 1702 and the power unit 1304. The datastore 1704 and the memory 1706 may be utilized to receive, send, read, write, manage, store, and/or index computer readable information, data, signals, code, commands, and/or executables as may be understood by those who may have skill in the art. The datastore 1704 and/or the memory 1706 may be configured to be accessed by the control unit 1702 such that the control unit 1702 may access and receive computer-readable data and/or information from the datastore 1704 and/or the memory 1706. Examples of the datastore 1704 include, without limitation, a hard disk drive, a solid state drive, a flash drive, a compact disc, cloud data storage, magnetic tape, a floppy disk, and/or any combinations thereof and any other device or component that may be utilized as the datastore 1704 as described herein as may be understood by those who may have skill in the art.

Examples of the memory 1706 include, without limitation, Random Access Memory (RAM), Read-Only Memory (ROM), Cache Memory, Virtual Memory, Video Random Access Memory (VRAM), Flash Memory, Dynamic Random Access Memory (DRAM), Static Random Access Memory (SRAM), Synchronous Dynamic Random Access Memory (SDRAM), Magneto resistive Random Access Memory (MRAM) and any combinations thereof and any other device or component that may be utilized as the memory 1706 as described herein as may be understood by those who may have skill in the art. It should be understood that embodiments of the lifting device 27 may include a data bus (not shown) such as a motherboard or other local mounting and/or computer communication facilitating device and/or printed circuit board or breakout board that may be utilized to carry and/or couple one or more of the optionally powered components in communication with one another, such as, and without limitation, the control unit 1702, the power unit 1304, the input interface 1502, the datastore 1704, the memory 1706, the communication unit 1708, the network 1750, and/or the user device 20 and/or any combinations thereof.

The control unit 1702 may be in communication with one or more of the optionally powered components, such as, and without limitation, one or more of the hoist assemblies 8, the foot connection members 19, the input interface 1502, the engagement member(s) 1310, the wheel members 1312, the piston members 1316, the top pulleys 1606, control unit 1702, the datastore 1704, the memory 1706, the communication unit 1708, and/or the power unit 1304 and any combinations thereof. The control unit 1702 may be operable to control, manage, and/or monitor, and/or send and receive signals to and from one or more of the optionally powered components, such as, and without limitation, the hoist assemblies 8, the foot connection members 19/wheel members, the engagement member(s) 1310, the piston members 1316, and/or the top pulleys 1606. The control unit 1702 may comprise, without limitation, one or more of a processor, a microcontroller, a co-processor, a graphics processing unit, a central processing unit, multicore processor, an advanced RISC machine (ARM) processor, an accelerated processing unit (APU), a field-programmable gate array, and any combinations thereof and any other device that may be used as the control unit 1702 as may be understood by those who may have skill in the art.

The control unit 1702 may be configured to selectively control one or more of the hoist assemblies 8 to move and/or actuate one or more of the hoist assemblies 8 between the collapsed position and the extended position. The control unit 1702 may be configured to selectively control one or more of the hoist assemblies 8 to move and/or actuate one or more of the hoist assemblies 8 between the collapsed position and the extended position based on a user device input signal and/or an input interface input signal received by the control unit 1702.

In some embodiments of the present invention, the control unit 1702 may also be configured to selectively control one or more of the foot connection members 19/wheel members 1312 to rotatably move relative to the side members 6 and/or the lower supports 1313 to cause the lifting device 27 to travel along a ground surface and/or surface that the foot connection members 19/wheel members 1312 may be in physical contact therewith. The control unit 1702 may further be configured to selectively control one or more of the foot connection members 19/wheel members 1312 to rotatably move based on a user device input signal and/or an input interface input signal received by the control unit 1702.

In some embodiments of the present invention, the control unit 1702 may be configured to selectively control one or more of the piston members 1316 to cause one or more of the piston members 1316 to move and/or actuate to and/or between the collapsed position and the extended position, which may concurrently cause the front shield member 30 to move between the collapsed position and the extended position. The control unit 1702 may be configured to selectively control one or more of the piston members 1316 to cause one or more of the piston members 1316 to move and/or actuate to and/or between the collapsed position and the extended position based on a user device input signal and/or an input interface input signal received by the control unit 1702.

In some embodiments of the present invention, the control unit 1702 may also be configured to selectively control one or more of the top pulleys 1606 to cause one or more of the top pulleys 1606 to rotatably move such that the load member 26 may be wrapped around the top pulley(s) 1606 and/or the load member 26 may be moved to the retracted position. In some embodiments of the present invention, the control unit 1702 may comprise a receiver, a transmitter, and/or a transceiver that may be operable to receive a user device input signal that may be sent and/or emitted from a user device 20. The control unit 1702 may be configured to be in communication with the user device 20 and/or the network 1750. The control unit 1702 may also be configured to be in communication with the user device 20 via the network 1750.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A lifting device comprising: a pair of side members movable between a collapsed position and an extended position; a respective pair of top support members that are carried by the pair of respective side members; a front shield member extending between and pivotally attached to each of the pair of side members and movable between a collapsed position and an extended position; a respective pair of hoist assemblies that are carried by the pair of respective side members, and movable between a collapsed position and an extended position; and a load member having ends connected to the pair of top support members and in communication with the pair of hoist assemblies; wherein the load member is moved between a retracted position and a released position when the pair of hoist assemblies move between the collapsed position and the extended position; wherein the pair of side members each comprise at least two legs and at least one connecting support member connected to and extending between the at least two legs; wherein the at least one connecting support member comprises an engagement member operable to move between an engaged position and a released position; wherein when the engagement member is in the engaged position the side member is prevented from moving between the collapsed position and the extended position; and wherein when the engagement member is in the released position the side member is moveable between the collapsed position and the extended position.

2. The device of claim 1, further comprising a bar member movable between a stowed position and a connected position; wherein the connected position is defined as the bar member extending between the pair of top support members.

3. The device of claim 1, wherein the front shield member comprises a first shield member and a second shield member that is pivotally connected to the first shield member.

4. The device of claim 3, wherein the collapsed position of the front shield member is defined as when the first and the second shield members are positioned to substantially face one another; and wherein the extended position of the front shield member is defined as when the first and the second shield members are positioned to be substantially aligned with one another in a similar plane.

5. The device of claim 1, further comprising at least one wheel member connected to at least one of the pair of side members.

6. The device of claim 1, further comprising an input interface in communication with a control unit; and wherein the control unit is operable to selectively move the pair of hoist assemblies between the collapsed position and the extended position based on inputs made via the input interface.

7. The device of claim 1, further comprising at least one piston having a first end connected to one of the pair of side members and a second end connected to the front shield member; and wherein the at least one piston actuates to move the front shield member between the collapsed position and the extended position.

8. The device of claim 1, wherein each of the pair of hoist assemblies comprise a pulley member that is in communication with the load member.

9. A lifting device comprising:

a pair of side members movable between a collapsed position and an extended position, each one of the pair of side members comprising two legs;

a respective pair of top support members that are carried by the pair of respective side members;

a respective pair of retention members connected to and carried within the pair of respective top support members;

a front shield member extending between and pivotally attached to each of the pair of side members and movable between a collapsed position and an extended position;

a respective pair of hoist assemblies that are carried by the pair of respective side members, and movable between a collapsed position and an extended position;

a load member in communication with the pair of hoist assemblies and having a respective pair of ends fixedly connected to the pair of respective retention members;

an input interface operable to receive inputs and generate an input interface signal; and a control unit in communication with the input interface and with the pair of hoist assemblies;

wherein the control unit includes a receiver operable to receive a user device input signal from a user device;

wherein the control unit is operable to selectively move the pair of hoist assemblies between the collapsed position and the extended position based on at least one of the input interface signal and the user device input signal; and wherein the load member is moved between a retracted position and a released position when the pair of hoist assemblies move between the collapsed position and the extended position.

10. The device of claim 9, further comprising a bar member movable between a stowed position and a connected position; wherein the connected position is defined as the bar member extending between the pair of top support members.

11. The device of claim 9, wherein the pair of side members each comprise at least one connecting support member connected to and extending between the two legs of the side member.

12. The device of claim 11, wherein the at least one connecting support member comprises an engagement member operable to move between an engaged position and a released position; wherein when the engagement member is in the engaged position the side member is prevented from moving between the collapsed position and the extended position; and wherein when the engagement member is in the released position the side member is moveable between the collapsed position and the extended position.

13. The device of claim 9, wherein the front shield member comprises a first shield member and a second shield member that is pivotally connected to the first shield member; wherein the collapsed position of the front shield member is defined as when the first and the second shield members are positioned to substantially face one another; and wherein the extended position of the front shield member is defined as when the first and the second shield members are positioned to be substantially aligned with one another in a similar plane.

14. The device of claim 9, further comprising at least one wheel member connected to at least one of the pair of side members.

15. The device of claim 9, further comprising at least one piston having a first end connected to one of the pair of side members and a second end connected to the front shield member.

16. The device of claim 15, wherein the at least one piston actuates to move the front shield member between the collapsed position and the extended position.

17. The device of claim 9, wherein each of the pair of hoist assemblies comprise a pulley member that is in communication with the load member.

18. A lifting device comprising:

a pair of side members movable between a collapsed position and an extended position;

a respective pair of top support members that are carried by the pair of respective side members;

at least one handle member positioned on and attached to at least one of the pair of respective side members and the pair of respective top support members;

a front shield member extending between and pivotally attached to each of the pair of side members and movable between a collapsed position and an extended position;

a respective pair of hoist assemblies that are carried by the pair of respective side members, and movable between a collapsed position and an extended position;

a load member having ends connected to the pair of top support members and in communication with the pair of hoist assemblies;

a power unit to be removably carried by the front shield member to supply power; and a respective pair of conduit carried by the pair of respective side members and moveable between a collapsed position and an extended position, the pair of conduit comprising telescopic tubing to carry wiring therein and therethrough;

wherein the load member is moved between a retracted position and a released position when the pair of hoist assemblies move between the collapsed position and the extended position;

wherein each one of the pair of side member comprises two legs, and wherein each of the legs comprise a wheel member attached to a lower portion thereof; and wherein the wheel member comprises a wheel lock operable to prevent rotational movement of the wheel member.

* * * * *